(12) United States Patent
Takada et al.

(10) Patent No.: US 10,521,061 B2
(45) Date of Patent: Dec. 31, 2019

(54) TOUCH DETECTION DEVICE

(71) Applicant: Japan Display Inc., Tokyo (JP)

(72) Inventors: Naoki Takada, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 8 days.

(21) Appl. No.: 15/921,952

(22) Filed: Mar. 15, 2018

(65) Prior Publication Data

US 2018/0275794 A1     Sep. 27, 2018

(30) Foreign Application Priority Data

Mar. 23, 2017    (JP) ................. 2017-057976

(51) Int. Cl.
    *G06F 3/044*       (2006.01)
    *G06F 3/047*       (2006.01)
    *G06F 3/0488*      (2013.01)
    *G06F 3/041*       (2006.01)

(52) U.S. Cl.
    CPC .............. *G06F 3/044* (2013.01); *G06F 3/047* (2013.01); *G06F 3/0488* (2013.01); *G06F 3/0412* (2013.01)

(58) Field of Classification Search
None
See application file for complete search history.

(56) References Cited

U.S. PATENT DOCUMENTS

2012/0075238 A1    3/2012   Minami et al.
2015/0199057 A1    7/2015   Minami et al.
2017/0371443 A1*   12/2017   Solven ................. G06F 3/0416

FOREIGN PATENT DOCUMENTS

JP       2012-073783 A     4/2012

* cited by examiner

*Primary Examiner* — Nitin Patel
*Assistant Examiner* — Amen Woldesenbet Bogale
(74) *Attorney, Agent, or Firm* — K&L Gates LLP

(57) ABSTRACT

According to an aspect, a touch detection device includes: a plurality of drive electrodes; a plurality of detection electrodes; a detection circuit electrically coupled to a first predetermined number or less of the detection electrodes; and a selection circuit configured to be electrically coupled to the plurality of detection electrodes and the detection circuit, wherein a second predetermined number as the number of the plurality of detection electrodes is larger than the first predetermined number, the selection circuit selects at least one of groups each including the first predetermined number or less of the detection electrodes, the detection circuit performs first touch detection based on self-capacitance of the selected detection electrodes, and the detection circuit performs second touch detection based on mutual capacitance between the detection electrodes that perform the first touch detection and the drive electrodes.

11 Claims, 28 Drawing Sheets

TOUCH DETECTION DEVICE

CROSS-REFERENCE TO RELATED APPLICATIONS

This application claims priority from Japanese Application No. 2017-057976, filed on Mar. 23, 2017, the contents of which are incorporated by reference herein in its entirety.

BACKGROUND

1. Technical Field

The present invention relates to a touch detection device.

2. Description of the Related Art

As described in, for example, Japanese Patent Application Laid-open Publication No. 2012-073783, a mutual capacitance method is known as a method employed in a touchscreen panel. In this method, a drive signal is applied to one (drive electrode) of two electrodes provided so as to be opposed to each other, and a touch operation is detected based on a change in electrostatic capacitance generated between the two electrodes.

In the mutual capacitance method, a detection circuit is provided that detects an electrical signal output from the other (detection electrode) of the two electrodes to determine whether the touch operation is made. In the mutual capacitance method, accuracy of detection per unit area corresponds to the number of intersections between sets of the two electrodes intersecting in a plan view. Therefore, to achieve at least either one of improvement in fineness in detection pitch or increase in size of a detection surface without decrease in fineness in detection pitch, the number of intersections between the sets of the two electrodes in the touchscreen panel needs to be increased. Simply increasing the number of the detection electrodes for increasing the number of intersections between the sets of the two electrodes necessitates an increase in number of input channels of the detection circuit corresponding to the number of the detection electrodes. The increase in number of input channels of the detection circuit brings about a problem of, for example, increases in size and cost of the detection circuit.

For the foregoing reasons, there is a need for a touch detection device capable of detecting the touch operation with a smaller number of the input channels of the detection circuit than the number of the detection electrodes.

SUMMARY

According to an aspect, a touch detection device includes: a plurality of drive electrodes; a plurality of detection electrodes provided apart from the plurality of drive electrodes; a detection circuit configured to be electrically coupled to a first predetermined number or less of the detection electrodes out of the plurality of detection electrodes; and a selection circuit configured to be electrically coupled to the plurality of detection electrodes and the detection circuit. A second predetermined number as the number of the plurality of detection electrodes is larger than the first predetermined number. The selection circuit is configured to select at least one of groups each including the first predetermined number or less of the detection electrodes from the second predetermined number of the detection electrodes. The detection circuit is configured to perform first touch detection based on self-capacitance of the selected detection electrodes. The detection circuit is configured to perform second touch detection based on mutual capacitance between the detection electrodes that perform the first touch detection and the drive electrodes.

DETAILED DESCRIPTION

Figure 1:
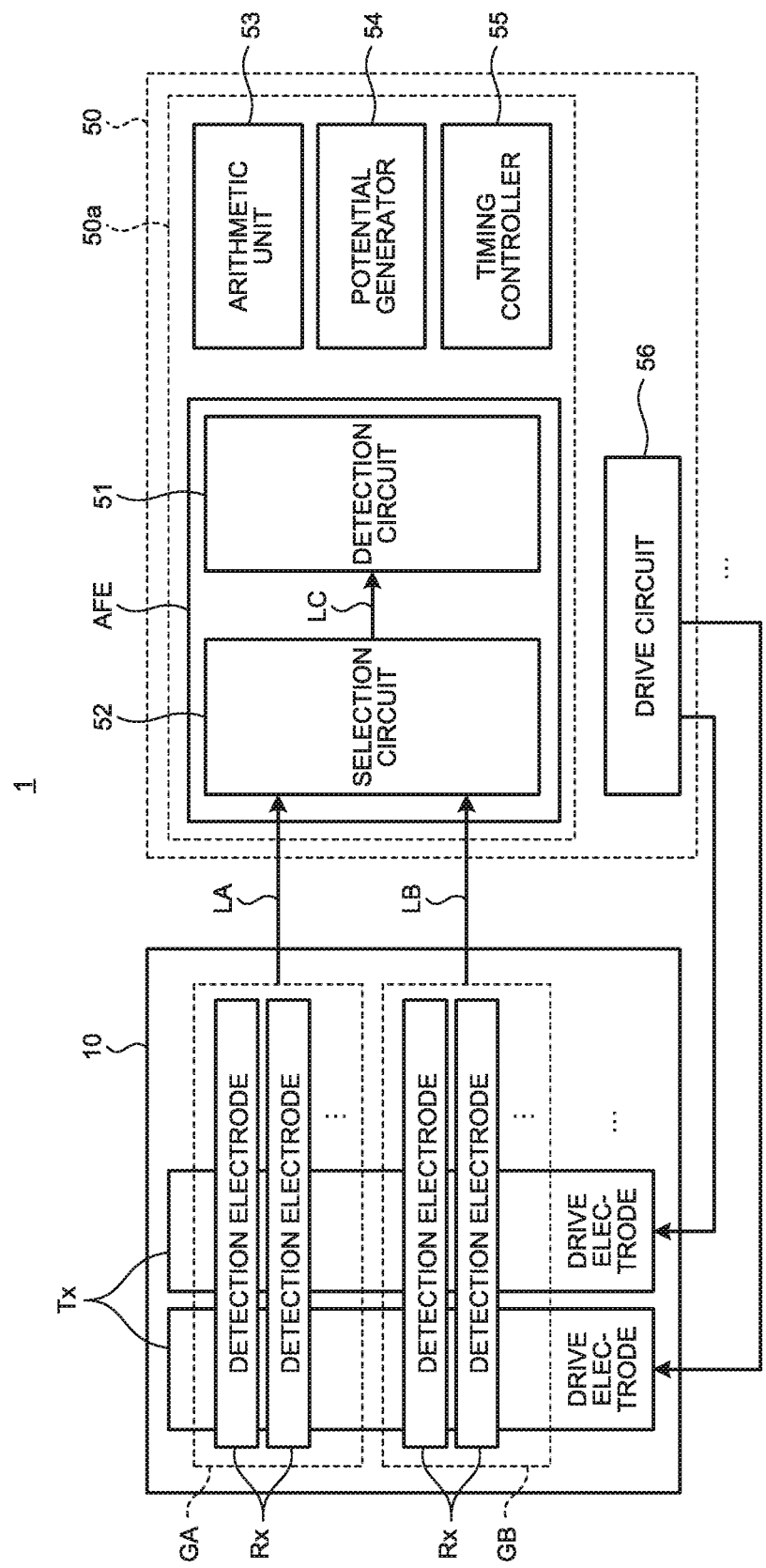
FIG. 1 is a block diagram illustrating the main configuration of a touch detection device according to a first embodiment of the present invention.

The following describes embodiments of the present invention with reference to the drawings. What is disclosed herein is merely an example, and the present invention naturally encompasses appropriate modifications easily conceivable by those skilled in the art while maintaining the gist of the invention. To further clarify the description, widths, thicknesses, shapes, and the like of various parts are schematically illustrated in the drawings as compared with actual aspects thereof, in some cases. However, they are merely examples, and interpretation of the present invention is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

First Embodiment

FIG. 1 is a block diagram illustrating the main configuration of a touch detection device according to a first embodiment of the present invention. This touch detection device 1 includes a touch detection panel 10 and circuitry 50.

The touch detection panel 10 includes a plurality of drive electrodes Tx and a plurality of detection electrodes Rx. The detection electrodes Rx are provided apart from the drive electrodes Tx. Each of the detection electrodes Rx is selected as one of the detection electrodes Rx included in any one group. Each group includes from one to a first predetermined number of the detection electrodes Rx. As a specific example, in the first embodiment, two groups of the detection electrodes Rx are provided, each group including, for example, 48 of the detection electrodes Rx. In FIG. 1 and other figures, one of the two groups of the detection electrodes serves as a first group GA, and the other thereof serves as a second group GB. Although details will be described later, in the present embodiment, certain ones of the detection electrodes Rx are selected by a selection circuit 52, and electrically coupled to a detection circuit 51. In the present embodiment, the total number of the detection electrodes Rx included in the touch detection panel 10 is assumed as a second predetermined number, and the number of the detection electrodes Rx electrically coupled to the detection circuit 51 is assumed as the first predetermined number. In some cases, a term "grouping" will be given to the operation of selecting the first predetermined number of the detection electrodes Rx from the second predetermined number of the detection electrodes Rx using the selection circuit 52 and electrically coupling the selected detection electrodes Rx to the detection circuit 51.

Figure 2:
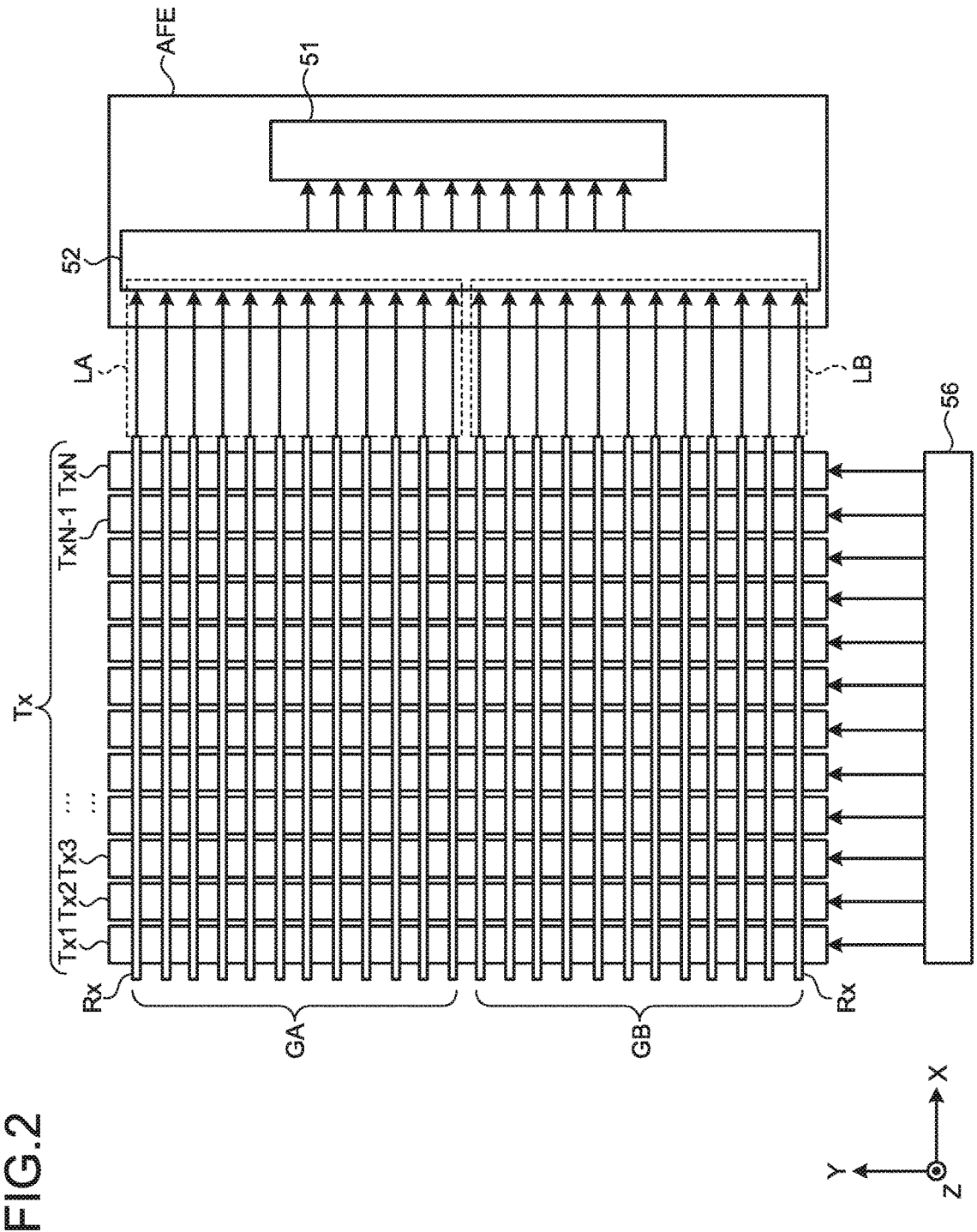
FIG. 2 is a plan view illustrating an exemplary positional relation between drive electrodes and detection electrodes included in a touch detection panel.

FIG. 2 is a plan view illustrating an exemplary positional relation between the drive electrodes Tx and the detection electrodes Rx included in a touch detection panel 10. The drive electrodes Tx and the detection electrodes Rx extend in directions different from each other in the plan view. Hereinafter, the extending direction of each of the detection electrodes Rx is assumed as a first direction (X-direction), and the extending direction of each of the drive electrodes Tx is assumed as a second direction (Y-direction). In the first embodiment, the X-direction is orthogonal to the Y-direction. The X-direction and the Y-direction are orthogonal to a third direction (Z-direction).

The drive electrodes Tx and the detection electrodes Rx are provided so as to be opposed to each other. Specifically, the drive electrodes Tx and the detection electrodes Rx are provided, for example, along respective different glass substrates. A first glass substrate provided with the drive electrodes Tx and a second glass substrate provided with the detection electrodes Rx are provided so as to be opposed to each other in a non-contact state, and thus the drive electrodes Tx are opposed to the detection electrodes Rx. More specifically, the first glass substrate is opposed to the second glass substrate in the Z-direction, for example, across a mounter. Either the drive electrodes Tx or the detection electrodes Rx may be provided on one surface (such as an front side) of one glass substrate, and the other thereof may be provided on the other surface (such as a back side) of the one glass substrate, the other surface being opposite to the one surface.

Hereinafter, an operation involving "proximity or contact of an object to or with a detection surface" will be called a "touch operation", in some cases. The touch detection device 1 detects the touch operation to the detection surface. The detection surface is a surface of the second glass substrate provided with the detection electrodes Rx and opposite to a surface thereof facing the first glass substrate.

Hereinafter, "detection of proximity or contact of the object to or with the detection surface" will be called "touch detection", in some cases. The touch detection is performed in a region where the detection electrodes Rx lie. Specifically, the touch detection is performed, for example, in a region where some of the detection electrodes Rx included in the first group GA lie and a region where the others of the detection electrodes Rx included in the second group GB lie, which are illustrated in FIG. 2. Hereinafter, the "region where the detection electrodes Rx included in the first group GA lie" will be called a "region of the first group GA", in some cases. The "region where the detection electrodes Rx included in the second group GB lie" will be called a "region of the second group GB", in some cases. A region where some of the detection electrodes Rx included in any other group lie will be called under the same rule, in some cases. A region including all the detection electrodes Rx will be called a "touch detection region ALLA", in some cases (refer to FIG. 28). The touch detection region ALLA is a region obtained by combining together the region of the first group GA and the region of the second group GB in the first embodiment.

The circuitry 50 is mounted on a glass substrate of the touch detection panel 10 using, for example, a chip-on-glass (COG) technique. The circuitry 50 may be mounted using another technique. For example, the circuitry 50 may be provided on a flexible printed circuit board provided so as to extend from the touch detection panel 10, or may be provided on another substrate coupled thereto through the flexible printed circuit board.

The circuitry 50 includes, for example, the detection circuit 51, the selection circuit 52, an arithmetic unit 53, a potential generator 54, a timing controller 55, and a drive circuit 56. In the first embodiment, components other than the drive circuit 56 among components of the circuitry 50 are provided in a control circuit 50a that is an integrated circuit. The detection circuit 51 and the selection circuit 52 are provided at an analog front end (AFE) mounted as a component of the control circuit 50a. The detection circuit 51 and the selection circuit 52 may be individual circuits.

Figure 3:
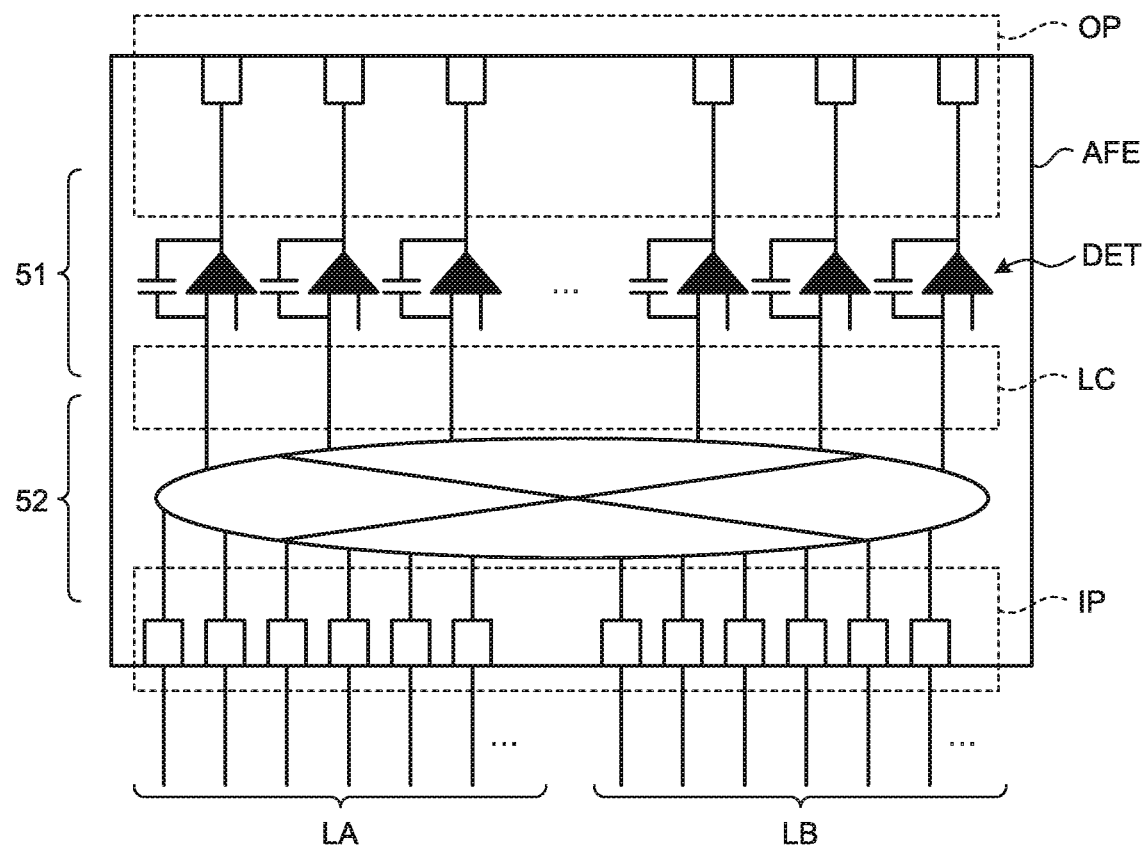
FIG. 3 is a schematic diagram illustrating a configuration example of an analog front end (AFE)

FIG. 3 is a schematic diagram illustrating a configuration example of the AFE. The detection circuit 51 detects a change in electrostatic capacitance of the first predetermined number or less of the detection electrodes Rx. Specifically, the detection circuit 51 includes a plurality of voltage detectors DET. Each of the voltage detectors DET generates a voltage corresponding to the electrostatic capacitance entered into wiring LC on the input side of the detection circuit 51 at a terminal OP on the output side thereof. An output portion of the AFE is coupled to the terminals OP on the output side of the first predetermined number of the voltage detectors DET. The number of input channels (number of lines of the wiring LC) of the detection circuit 51 is equal to the number of the voltage detectors DET. The number of output channels (number of the terminals OP) of the detection circuit 51 is equal to the number of the voltage detectors DET. The number of detection electrodes Rx coupled to the detection circuit 51 is equal to or smaller than the first predetermined number.

The second predetermined number as the number of the detection electrodes Rx is larger than the first predetermined number. Terminals IP are provided on the input side of the selection circuit 52 such that the selection circuit 52 can select the first predetermined number or less of the detection electrodes Rx from the second predetermined number of the detection electrodes Rx. That is, the number of the terminals IP is equal to or smaller than the first predetermined number. The output side of the selection circuit 52 is coupled to the input side of the detection circuit 51. Specifically, the selection circuit 52 is, for example, a multiplexer. The terminals IP on the input side of the selection circuit 52 are configured to couple to selected one of two wiring groups (a first wiring group LA and a second wiring group LB). The detection electrodes Rx included in the first group GA are coupled to the terminals IP on the input side of the selection circuit 52 through the first wiring group LA. The detection electrodes Rx included in the second group GB are coupled to the terminals IP on the input side of the selection circuit 52 through the second wiring group LB. The output side of the selection circuit 52 is coupled to the wiring LC. In the first embodiment, the number of the detection electrodes Rx is equal to the number of the terminals IP on the input side of the selection circuit 52 (total number of lines of the wiring included in the two wiring groups), and the number thereof is, for example, 96. The number of detection electrodes Rx included in one group, the number of lines of the wiring included in one wiring group, the number of lines of the wiring LC on the output side of the selection circuit 52, and the number of the voltage detectors DET are equal to one another; and the number thereof is, for example, 48. That is, in the first embodiment, the first predetermined number is 48, and the second predetermined number is 96. The specific numbers of the first and second predetermined numbers in the first embodiment are mere examples, and are not limited thereto, but can be changed as appropriate. The first predetermined number only needs to be a natural number smaller than the second predetermined number. The output of the AFE, that is, the output of the detection circuit 51 is digitized by an analog-to-digital conversion circuit (A/D converter), which is not illustrated, and is entered into the arithmetic unit 53. The touch detection panel 10 may have a configuration including the AFE and the drive circuit 56. In this case, circuits of the arithmetic unit 53 and the like are provided, for example, on a flexible printed circuit (FPC) board coupled to the touch detection panel 10, or on a substrate coupled to the touch detection panel 10 through the FPC.

The arithmetic unit 53 performs various calculations related to operations of the touch detection device 1. Specifically, the arithmetic unit 53 performs, for example, the touch detection (first touch detection and second touch detection) based on the output of the AFE. The arithmetic unit 53 also controls operation timing of the drive circuit 56 based on the first touch detection.

Figure 4:
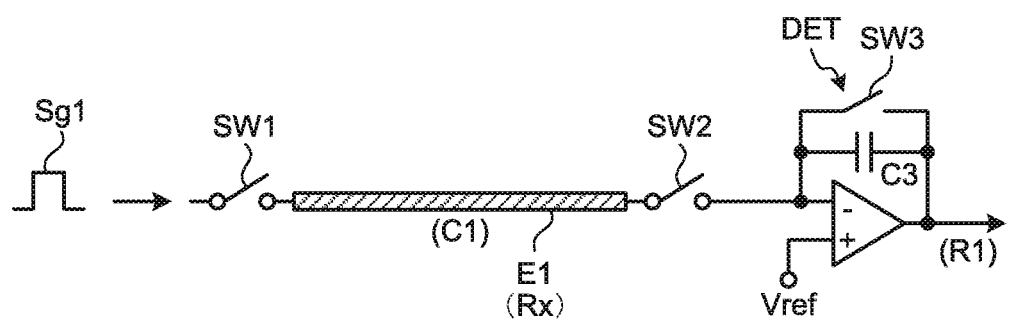
FIG. 4 is an explanatory diagram for explaining the basic principle of self-capacitance touch detection, and illustrates a state where a finger is neither in contact with nor in proximity to the touch detection panel.
Figure 5:
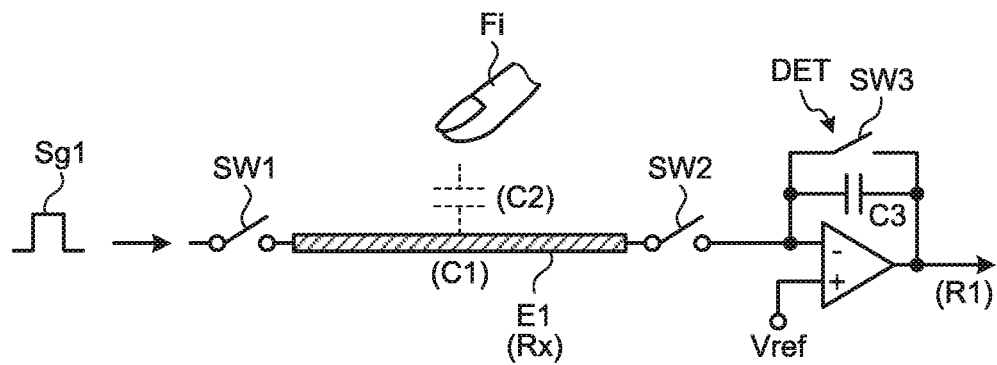
FIG. 5 is an explanatory diagram for explaining the basic principle of the self-capacitance touch detection, and illustrates a state where the finger is in contact with or in proximity to the touch detection panel.
Figure 6:
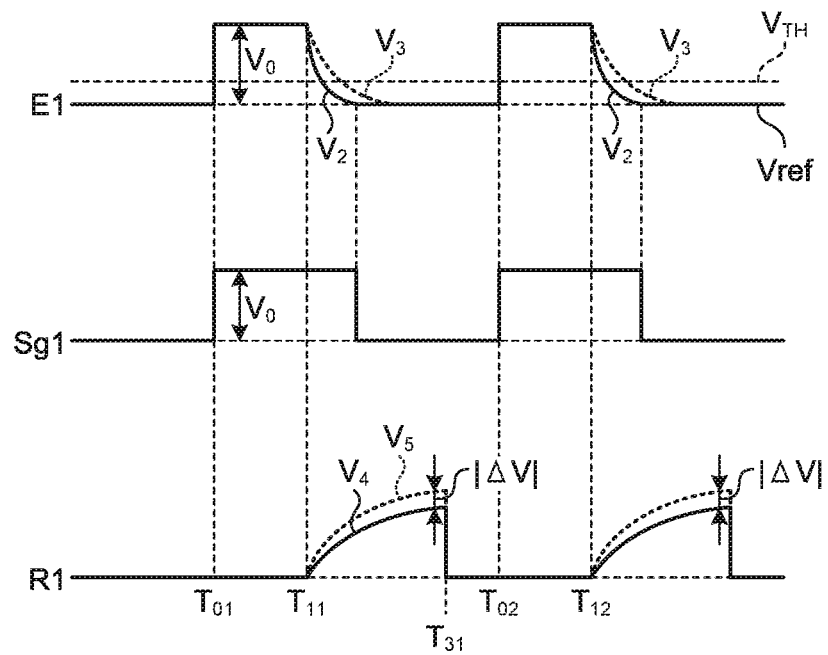
FIG. 6 is a diagram illustrating exemplary waveforms of a drive signal and a touch detection signal.

The first touch detection and the second touch detection will be described in this order. The first touch detection is self-capacitance touch detection performed based on the self-capacitance of the detection electrodes Rx. The basic principle of the self-capacitance touch detection will be described with reference to FIGS. 4 to 6. FIG. 4 is an explanatory diagram for explaining the basic principle of the self-capacitance touch detection, and illustrates a state where a finger Fi is neither in contact with nor in proximity to the touch detection panel. FIG. 5 is an explanatory diagram for explaining the basic principle of the self-capacitance touch detection, and illustrates a state where the finger Fi is in contact with or in proximity to the touch detection panel. FIG. 6 is a diagram illustrating exemplary waveforms of a drive signal Exvcom and a touch detection signal. The following describes an exemplary case where the human finger Fi is in contact with or in proximity to the touch detection panel. The touch operation is, however, not limited to being made by the finger Fi, but may be made through a device, such as a stylus pen, including a conductor.

As illustrated in FIG. 4, in the state where the finger Fi is neither in contact with nor in proximity to the first electrode E1, an alternating-current (AC) rectangular wave Sg1 having a predetermined frequency (such as roughly several kilohertz to several hundred kilohertz) is applied to a first electrode E1. The first electrode E1 has electrostatic capacitance C1, and conducts a current corresponding to the electrostatic capacitance C1. The voltage detector DET converts variation in current corresponding to the AC rectangular wave Sg1 into variation in voltage (waveform $V_4$ of a solid line (refer to FIG. 6)).

In the state where the finger Fi is in contact with or in proximity to the first electrode E1, electrostatic capacitance C2 between the finger Fi and the touch detection panel 10 is added to the electrostatic capacitance C1 of the first electrode E1, as illustrated in FIG. 5. As a result, applying the AC rectangular wave Sg1 to the first electrode E1 causes a current to flow corresponding to the electrostatic capacitance C1 and C2. As illustrated in FIG. 6, the voltage detector DET converts the variation in current corresponding to the AC rectangular wave Sg1 into variation in voltage (waveform $V_5$ of a dotted line). The voltage values of the obtained waveforms $V_4$ and $V_5$ are integrated, and compared with each other, and thereby, a determination can be made as to whether or not the finger Fi is in contact with or in proximity to the first electrode E1. The determination may be made using, for example, a method in which periods of time until waveforms $V_2$ and $V_3$ in FIG. 6 drop to a predetermined reference voltage are obtained and compared with each other.

Specifically, as illustrated in FIGS. 4 and 5, the first electrode E1 is configured to be decoupled from other elements by a switch SW1 and a switch SW2. In FIG. 6, the AC rectangular wave Sg1 increases in voltage level by a voltage $V_0$, at time $T_{01}$. At this time, the switch SW1 is on, and the switch SW2 is off. Hence, the voltage of the first electrode E1 also increases by the voltage $V_0$. At this time, turning off the switch SW1 brings the first electrode E1 into a floating state. The first electrode E1 in the floating state is maintained at the voltage $V_0$ by the electrostatic capacitance C1 of the first electrode E1 (refer to FIG. 4) or by capacitance (C1+C2; refer to FIG. 5) obtained by adding the electrostatic capacitance C2 produced by the contact or proximity of the finger Fi or the like to the capacitance C1 of the first electrode E1. In addition, a switch SW3 is tuned on before time $T_{11}$ and turned off after a lapse of a predetermined time to reset the voltage detector DET. This reset operation sets an output voltage to a voltage substantially equal to a reference voltage Vref.

Subsequently, after the switch SW2 is tuned on at time $T_{11}$, the voltage at an inverting input terminal of the voltage detector DET becomes the voltage $V_0$ of the first electrode E1. Then, the voltage at the inverting input terminal of the voltage detector DET drops to the reference voltage Vref according to the time constant of the electrostatic capacitance C1 (or C1+C2) of the first electrode E1 and electrostatic capacitance C3 in the voltage detector DET. At this time, an electric charge of the electrostatic capacitance C1 (or C1+C2) of the first electrode E1 moves to the electrostatic capacitance C3 in the voltage detector DET. As a result, an output (R1) of the voltage detector DET increases. When the finger Fi or the like is neither in contact with nor in proximity to the first electrode E1, the output (R1) of the voltage detector DET is represented by the waveform $V_4$ indicated by the solid line. The output (R1) of the voltage detector DET is represented by the waveform $V_4$ is given as R1=C1·$V_0$/C3. After the capacitance is added by the influence of the finger Fi or the like, the output (R1) of the voltage detectors DET is represented by the waveform $V_5$ indicated by the dotted line. The output (R1) of the voltage detectors DET represented by the waveform $V_5$ is given as R1=(C1+C2)·$V_0$/C3. Then, the switch SW2 is turned off and the switches SW1 and SW3 are turned on at a predetermined time point. This operation lowers the potential of the first electrode E1 to a low level potential equal to that of the AC rectangular wave Sg1, and resets the voltage detector DET. The predetermined time point is a time point at time $T_{31}$ after the electric charge in the electrostatic capacitance C1 (or C1+C2) of the first electrode E1 has sufficiently moved to the electrostatic capacitance C3. In this operation, the switch SW1 can be turned on at any time before time $T_{02}$ after the switch SW2 is turned off. The voltage detector DET can be reset at any time before time $T_{12}$ after the switch SW2 is turned off. The operation described above is repeated at the predetermined frequency (such as roughly several kilohertz to several hundred kilohertz). Whether the external proximate object is present (whether the touch is made) can be determined based on the absolute value |ΔV| of a difference between the waveforms $V_4$ and $V_5$. As illustrated in FIG. 6, the potential of the first electrode E1 is represented by the waveform $V_2$ when the finger Fi or the like is neither in contact with nor in proximity to the first electrode E1. The potential of the first electrode E1 is represented by the waveform $V_3$ when the electrostatic capacitance C2 is added by the influence of the finger Fi or the like. Whether the external proximate object is present (whether the touch is made) can also be determined by measuring times until voltages of the respective waveforms $V_2$ and $V_3$ drop to a predetermined voltage $V_{TH}$. Each of the detection electrodes Rx serves as the first electrode E1 of the self-capacitance type.

Figure 7:
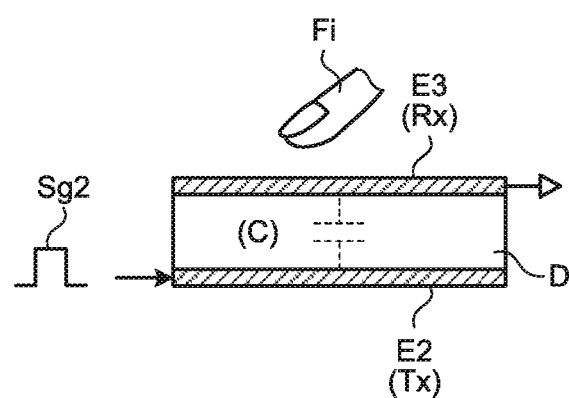
FIG. 7 is an explanatory diagram for explaining the basic principle of mutual capacitance touch detection, and illustrates the state where the finger is neither in contact with nor in proximity to the touch detection panel.
Figure 8:
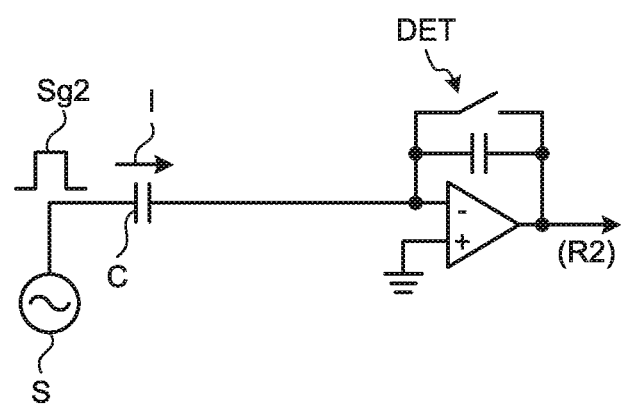
FIG. 8 is an explanatory diagram illustrating an exemplary equivalent circuit in the state illustrated in FIG. 7 where the finger is neither in contact with nor in proximity to the touch detection panel.
Figure 9:
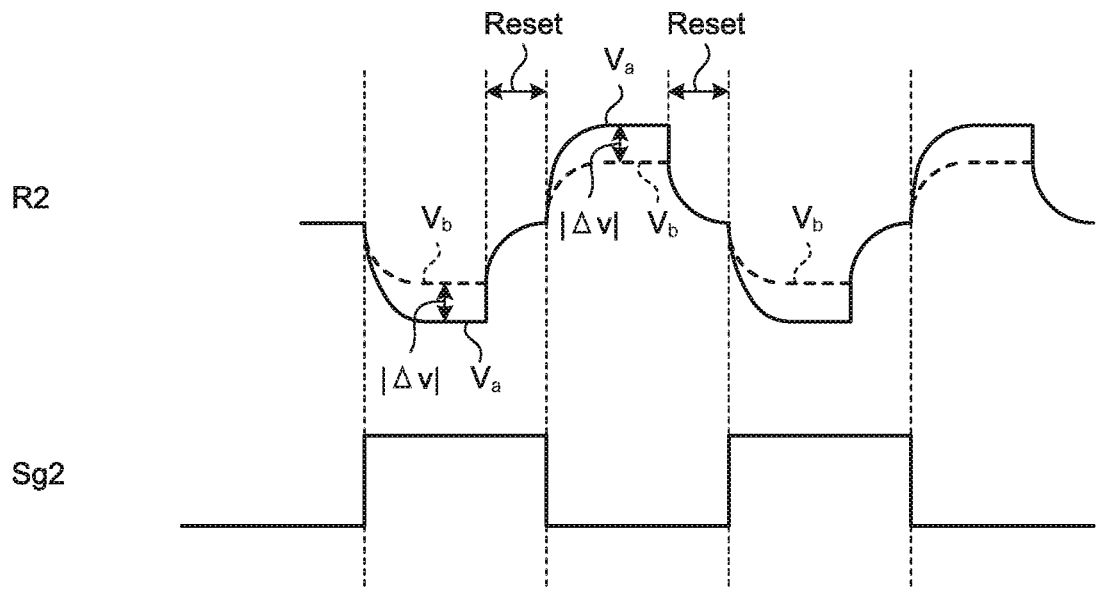
FIG. 9 is a diagram illustrating exemplary waveforms of the drive signal and the touch detection signal.

The second touch detection is mutual capacitance touch detection based on the mutual capacitance between the drive electrodes Tx and the detection electrodes Rx. The basic principle of the mutual capacitance touch detection will be described with reference to FIGS. 7 to 9. FIG. 7 is an explanatory diagram for explaining the basic principle of the mutual capacitance touch detection, and illustrates the state where the finger Fi is neither in contact with nor in proximity to the touch detection panel. FIG. 8 is an explanatory diagram illustrating an exemplary equivalent circuit in the state illustrated in FIG. 7 where the finger Fi is neither in contact with nor in proximity to the touch detection panel. FIG. 9 is a diagram illustrating exemplary waveforms of the drive signal Exvcom and the touch detection signal.

For example, as illustrated in FIG. 7, a capacitive element C includes a pair of electrodes, that is, a second electrode E2 and a third electrode E3 that are arranged so as to be opposed to each other across a dielectric material D. As illustrated in FIG. 8, one end of the capacitive element C is coupled to an alternating-current signal source (drive signal source) S, and the other end thereof is coupled to the voltage detector DET at a mutual signal output portion DB.

An AC rectangular wave Sg2 having the predetermined frequency (such as roughly several kilohertz to several hundred kilohertz) is applied from the alternating-current signal source S to the second electrode E2 (the one end of the capacitive element C). This waveform application causes an output waveform (touch detection signal R2) illustrated in FIG. 9 to appear through the voltage detector DET coupled to the third electrode E3 (the other end of the capacitive element C). The AC rectangular wave Sg2 serves as, for example, the drive signal Exvcom output from the drive circuit 56.

In the state where the finger Fi is not in contact with (or in proximity to) the third electrode E3, that is, in a non-contact state, an output (current I) corresponding to the capacitance value of the capacitive element C flows with charge and discharge of the capacitive element C, as illustrated in FIGS. 7 and 8. As illustrated in FIG. 9, the voltage detector DET converts the variation in the current I corresponding to the AC rectangular wave Sg2 into variation in voltage (waveform $V_a$ of a solid line).

In the state where the finger Fi is in contact with (or in proximity to) the third electrode E3, that is, in a contact state, electrostatic capacitance generated by the finger Fi is in contact with or in proximity to the touch detection electrode E3. As a result, a fringe component of the electrostatic capacitance between the second electrode E2 and the third electrode E3 is interrupted, and the capacitive element C serves as a capacitive element having a capacitance value smaller than that in the non-contact state. The current I flows in a manner varying with the variation of the capacitive element C. As illustrated in FIG. 9, the voltage detector DET converts the variation in the current I corresponding to the AC rectangular wave Sg2 into variation in voltage (waveform $V_b$ of a dotted line). In this case, the waveform $V_b$ has a smaller amplitude than that of the above-mentioned waveform $V_a$. As a result, the absolute value |Δv| of a voltage difference between the waveforms $V_a$ and $V_b$ changes according to the influence of the object, such as a finger Fi, approaching from the outside. The voltage detector DET preferably performs an operation including a period Reset during which the charge or discharge of the capacitor is reset by switching in the circuit in accordance with the frequency of the AC rectangular wave Sg2. Such an operation enables more accurate detection of the absolute value |Δv| of the voltage difference between the waveforms $V_a$ and $V_b$.

Figure 10:
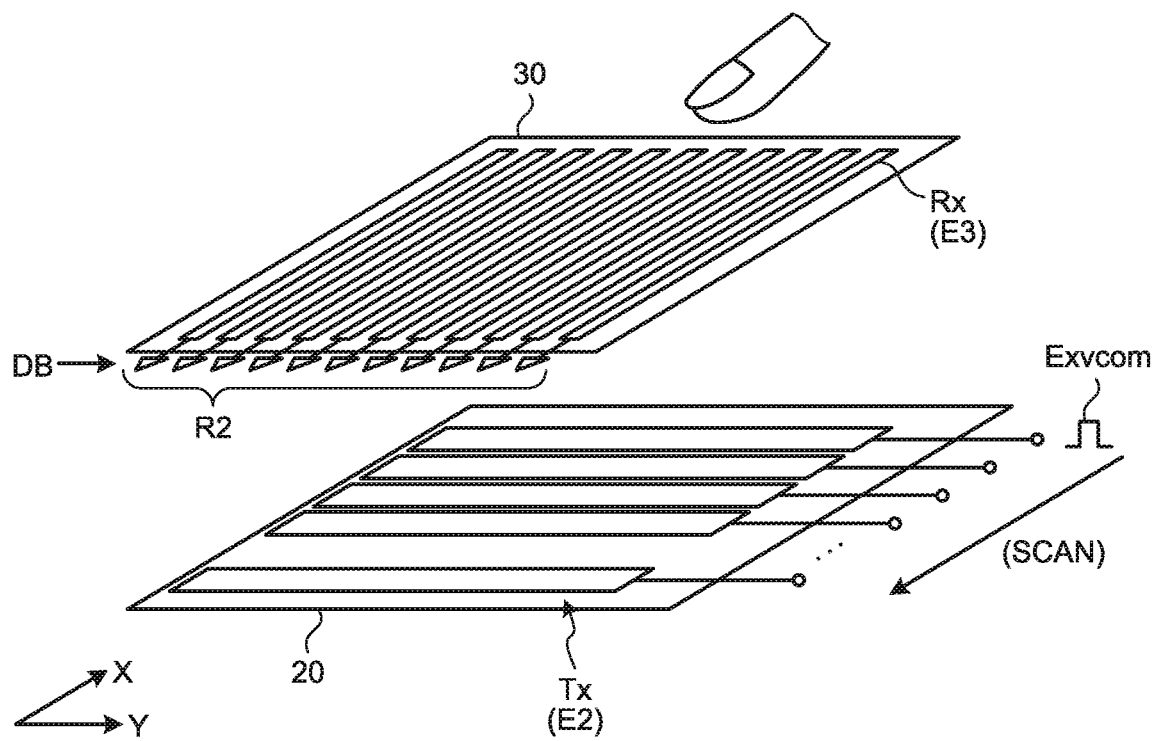
FIG. 10 is a perspective view illustrating an arrangement example of the drive electrodes and the detection electrodes and an exemplary scanning direction of the drive electrodes.

FIG. 10 is a perspective view illustrating an arrangement example of the drive electrodes Tx and the detection electrodes Rx and an exemplary scanning direction of the drive electrodes Tx. Each of the drive electrodes Tx serves as the second electrode E2. Each of the detection electrodes Rx serves as the third electrode E3 for performing the touch detection using the mutual capacitance method.

Electrode patterns of the drive electrodes Tx and the detection electrodes Rx intersecting each other in a skewed positional relation generate electrostatic capacitance at intersecting portions therebetween. Specifically, the mutual capacitance is generated between the drive electrodes Tx and the detection electrodes Rx, for example, according to the AC rectangular wave Sg2 output as the drive signal Exvcom from the drive circuit 56 to the drive electrodes Tx. The mutual signal output portion DB outputs the touch detection signal R2 based on the output of the mutual capacitance.

The electrode patterns intersecting as illustrated in FIG. 10 provide capacitive touch sensors configured in a matrix in the detection region. Consequently, a position where the external proximate object is in contact with or in proximity to the touch detection panel can be detected by scanning the entire display area on a display surface serving as the touch detection surface. As a result, the touch detection is performed along the scanning direction indicated by an arrow in FIG. 10.

The potential generator 54 outputs various voltages appropriate for operating, for example, the circuitry 50 to supply power for operating the circuitry 50. The timing controller 55 outputs various signals for synchronizing operations of respective components of the touch detection device 1. Specifically, the timing controller 55 outputs, for example, a first synchronizing signal TSVD and a second synchronizing signal TSHD (refer, for example, to FIG. 13). The first synchronizing signal TSVD is a pulse output, for example, every one sixtieth second. The second synchronizing signal TSHD is a pulse output at time intervals shorter than that of the first synchronizing signal TSVD.

The drive circuit 56 scans the drive electrodes Tx by sequentially outputting the drive signal Exvcom to the detection electrodes Tx under the timing control by the timing controller 55 (refer to FIG. 10). The number of channels for outputting the drive signal Exvcom from the drive circuit 56 is equal to the number of the drive electrodes Tx. Any number of the drive electrodes Tx can be provided.

Figure 11:
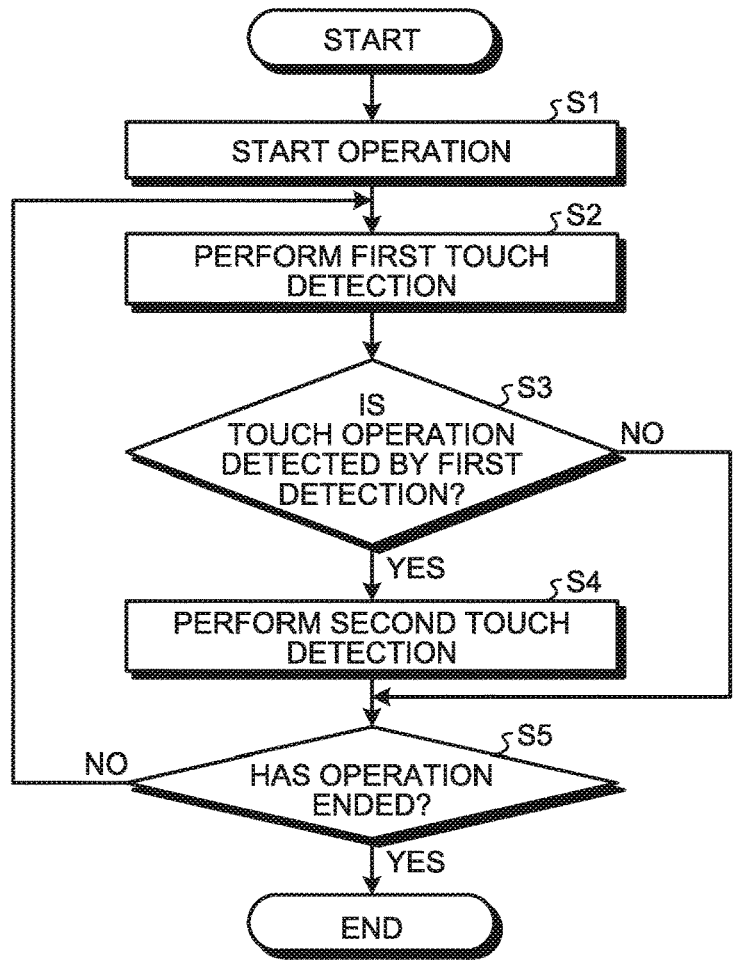
FIG. 11 is a flowchart illustrating a basic flow of the touch detection by the touch detection device.

The following describes the basic flow of the touch detection by the touch detection device 1 with reference to FIG. 11. FIG. 11 is a flowchart illustrating the basic flow of the touch detection by the touch detection device 1. The touch detection device 1 starts operation (Step S1), and then performs the first touch detection (Step S2). The first touch detection of the first embodiment is the touch detection based on the self-capacitance of the detection electrodes Rx in each of a plurality of groups.

If no touch operation is detected by the first touch detection (No at Step S3), the processing at Step S2 is performed again after a predetermined time interval. That is, the first touch detection is repeated at the predetermined time intervals (at intervals of approximately one one-hundred-twentieth second) while no touch operation is detected by the first touch detection. If a touch operation is detected by the first touch detection (Yes at Step S3), the second touch detection is performed (Step S4). The second touch detection of the first embodiment is the touch detection based on the mutual capacitance of the detection electrodes Rx of a group including the detection electrodes Rx where the self-capacitance corresponding to the touch operation has been detected by the first touch detection. Until the operation ends after the processing at Step S4 is performed (while the result is No at Step S5), the processing at Step S2 is performed again after the predetermined time interval has elapsed from the immediately preceding processing at Step S2. That is, the first touch detection is repeated at the predetermined time intervals even if the second touch detection is performed. The second touch detection is performed between the repeated first touch detection operations.

For example, the arithmetic unit 53 performs the processing to determine whether the touch operation is detected by the first touch detection. For example, the arithmetic unit 53 performs the processing to determine, depending on the determination result, whether the touch is detected by the second touch detection. For example, the arithmetic unit 53 performs the processing to switch the selection of the detection electrodes Rx using the selection circuit 52. The arithmetic unit 53 also performs calculation to identify a position where the touch operation is detected by the first touch detection and the second touch detection.

Figure 12:
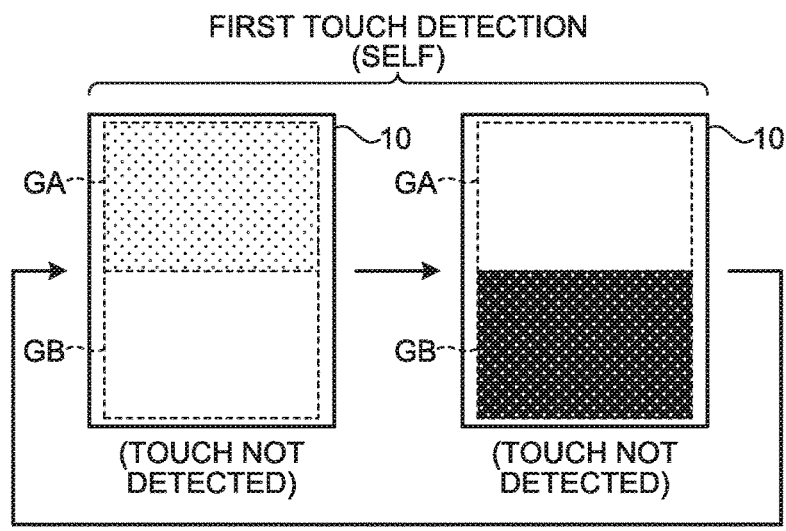
FIG. 12 is a schematic diagram illustrating an example in which first touch detection is repeatedly performed when second touch detection is not performed.
Figure 13:
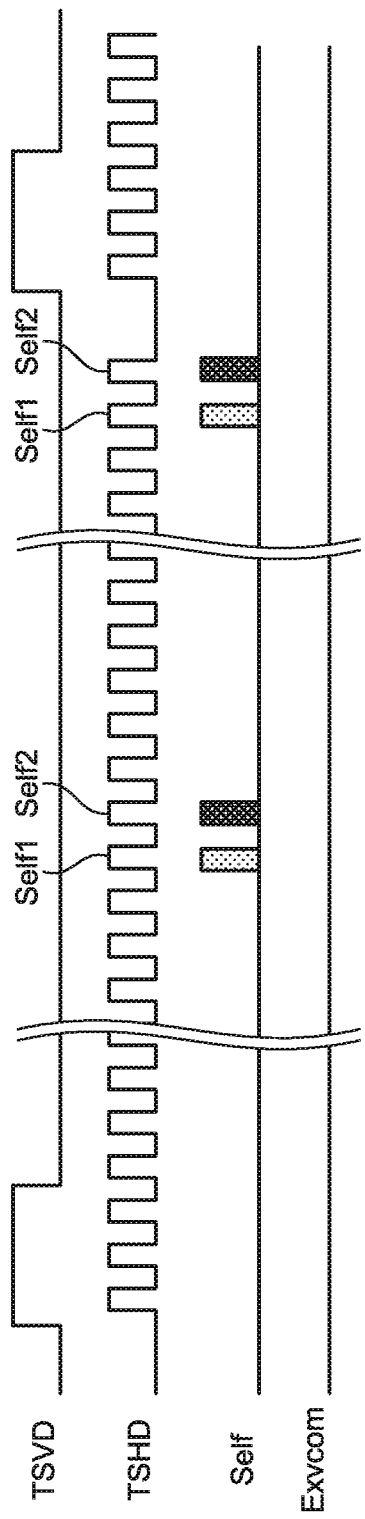
FIG. 13 is a timing diagram of the example illustrated in FIG. 12 in which the first touch detection is repeatedly performed when the second touch detection is not performed.

FIG. 12 is a schematic diagram illustrating an example in which the first touch detection is repeatedly performed when the second touch detection is not performed. FIG. 13 is a timing diagram of the example illustrated in FIG. 12 in which the first touch detection is repeatedly performed when the second touch detection is not performed. The first touch detection in the first embodiment is sequentially performed on a group-by-group basis. Specifically, as illustrated, for example, in FIG. 12, the first touch detection using the detection electrodes Rx included in the first group GA and the first touch detection using the detection electrodes Rx included in the second group GB are sequentially performed. More specifically, first, the selection circuit 52 couples the detection electrodes Rx included in the first group GA to the detection circuit 51. The first touch detection is performed using the detection electrodes Rx included in the first group GA coupled to the detection circuit 51. Then, the selection circuit 52 couples the detection electrodes Rx included in the second group GB to the detection circuit 51. The first touch detection is performed using the detection electrodes Rx included in the second group GB coupled to the detection circuit 51.

Hereinafter, the first touch detection performed while the detection electrodes Rx included in the first group GA are coupled to the detection circuit 51 will be called the "first touch detection of the first group GA", in some cases. The first touch detection performed while the detection electrodes Rx included in the second group GB are coupled to the detection circuit 51 will be called the "first touch detection of the second group GB", in some cases. In the same manner, regarding the second touch detection, the second touch detection performed while the detection electrodes Rx included in the first group GA (or the second group GB) are coupled to the detection circuit 51 by the selection circuit 52 is called the "second touch detection of the first group GA (or the second group GB)", in some cases. The first touch detection or the second touch detection using the detection electrodes Rx included in any other group will be called under the same rule, in some cases.

If the touch operation is detected by neither the first touch detection of the first group GA nor the first touch detection of the second group GB that have been sequentially performed, the second touch detection is not performed, and the first touch detection is repeated at the predetermined time intervals. The first touch detection of the first group GA and the first touch detection of the second group GB are performed according to a frequency (for example, at 120 Hz) set in advance.

More specifically, the first synchronizing signal TSVD is output according to a first output frequency (for example, at 60 Hz). The second synchronizing signal TSHD is output according to a second output frequency (for example, at (number of drive electrodes Tx+2)×120 Hz). The timing of performing the first touch detection is set based on the first synchronizing signal TSVD and the second synchronizing signal TSHD. In FIG. 13 and other figures, a pulse Self1 of the second synchronizing signal TSHD corresponding to a time when the first touch detection of the first group GA is performed is illustrated with its reference sign. In FIG. 13 and other figures, a pulse Self2 of the second synchronizing signal TSHD corresponding to a time when the first touch detection of the second group GB is performed is illustrated with its reference sign. In FIG. 13 and other figures, the times when the first touch detection is performed are illustrated as pulses of "Self". Shadings applied to the pulses of "Self" in FIG. 13 and other figures correspond to shadings applied to regions including the detection electrodes Rx used for the first touch detection in corresponding schematic examples (such as the schematic example of FIG. 12 corresponding to the timing diagram of FIG. 13).

Figure 14:
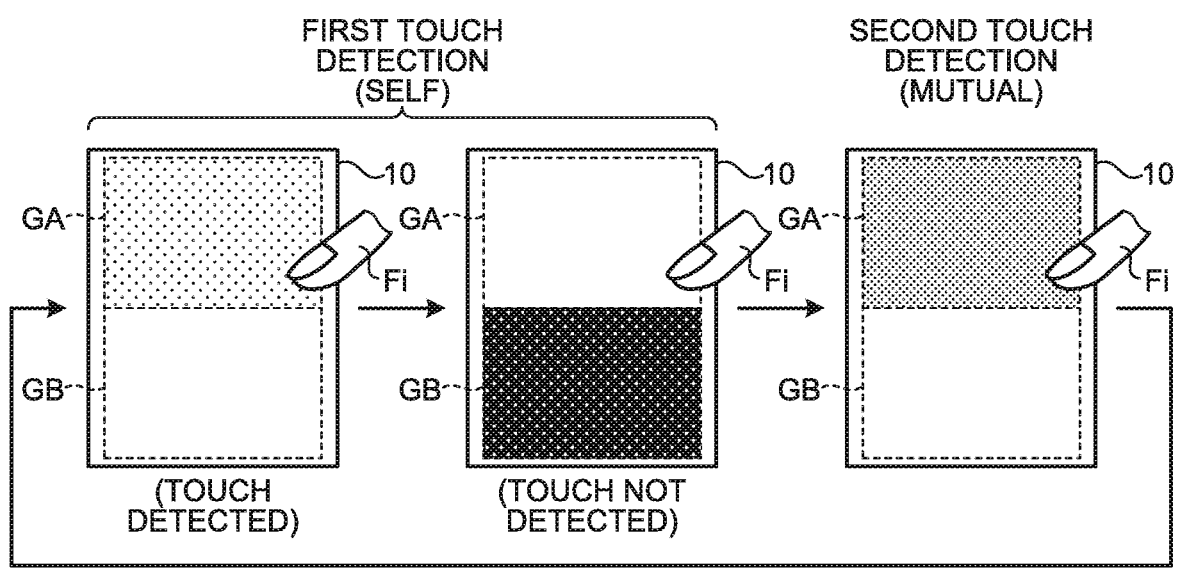
FIG. 14 is a schematic diagram illustrating a case where the second touch detection of a first group is performed.

If the touch operation is detected by at least one of the first touch detection of the first group GA and the first touch detection of the second group GB that have been sequentially performed, the second touch detection is performed. First, a case of performing the second touch detection of the first group GA will be described with reference to FIGS. 14 and 15. Then, a case of performing the second touch detection of the second group GB will be described with reference to FIGS. 16 and 17. Then, a case of performing the second touch detection of the first group GA and the second touch detection of the second group GB will be described with reference to FIGS. 18 and 19. In FIG. 14 and other figures, the touch operation by the finger Fi is illustrated as an example of the touch operation.

Figure 15:
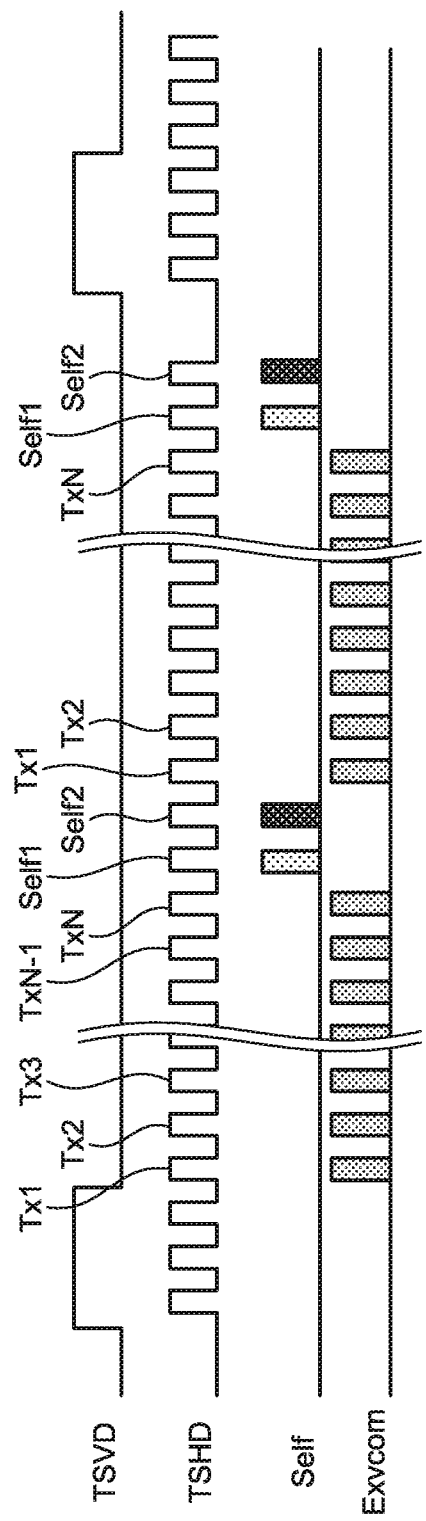
FIG. 15 is a timing diagram of the case where the second touch detection of the first group is performed.

FIG. 14 is a schematic diagram illustrating the case where the second touch detection of the first group GA is performed. FIG. 15 is a timing diagram of the case where the second touch detection of the first group GA is performed. For example, in the example illustrated in FIG. 14, the touch operation is performed in the region of the first group GA. As a result, the touch operation is detected by the first touch detection of the first group GA. In this case, the second touch detection of the first group GA is performed. In contrast, no touch operation is performed in the region of the second group GB in the example illustrated in FIG. 14. As a result, no touch operation is detected by the first touch detection of the second group GB. In this case, the second touch detection of the second group GB is not performed.

Specifically, as illustrated, for example, in FIG. 15, the drive circuit 56 sequentially outputs the drive signal Exvcom according to the output timings of pulses of the second synchronizing signal TSHD other than the pulses Self1 and Self2. As a result, the detection surface is scanned in the arrangement direction of the drive electrodes Tx (such as the X-direction). In the example illustrated in FIGS. 14 and 15, the detection electrodes Rx included in the first group GA remain to be coupled to the detection circuit 51 by the selection circuit 52 during the period in which the detection surface is scanned as described above. As a result, the second touch detection of the first group GA is performed. In the case of the example illustrated in FIGS. 14 and 15, a report rate of the second touch detection of the first group GA is 120 Hz.

Shadings applied to the pulses of the drive signal Exvcom illustrated in FIG. 15 and other figures correspond to shadings applied to regions including the detection electrodes Rx used for the second touch detection in corresponding schematic examples (such as the schematic example of FIG. 14 corresponding to the timing diagram of FIG. 15). The pulses of the drive signal Exvcom for one group illustrated in FIG. 15 and other figures represent scanning driven by the drive signal Exvcom individually output to each of the drive electrodes Tx. The pulses of the drive signal Exvcom for one group include consecutive pulses of the drive signal Exvcom. The number of pulses of the drive signal Exvcom for one group corresponds to, for example, the number of the drive electrodes Tx. Pulses Tx1, Tx2, Tx3, . . . , TxN−1, and TxN of the second synchronizing signal TSHD illustrated in FIG. 15 and other figures correspond to output timings of the drive signal Exvcom individually output to each of N drive electrodes Tx, N being the total number of the drive electrodes Tx. The pulses of the drive signal Exvcom for the respective groups are sectioned by the output timings of the pulses Self1 and Self2. In this manner, if the first touch detection is performed at a predetermined period and the self-capacitance in response to the touch operation is detected by one or more of the detection electrodes Rx, the second touch detection is performed at a time when the first touch detection is not performed.

Figure 16:
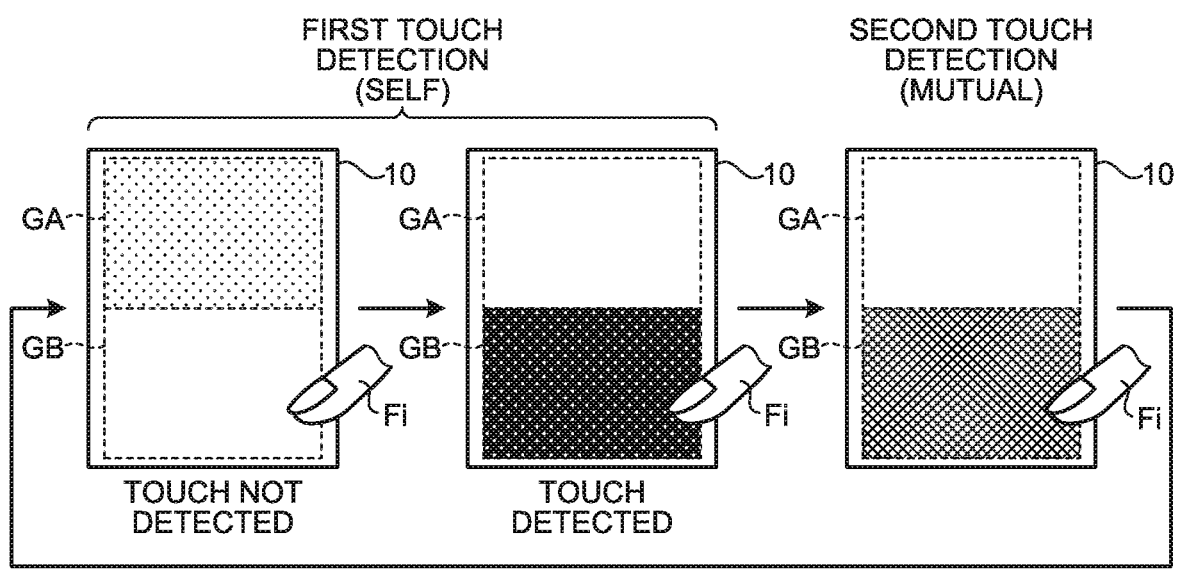
FIG. 16 is a schematic diagram illustrating a case where the second touch detection of a second group is performed.
Figure 17:
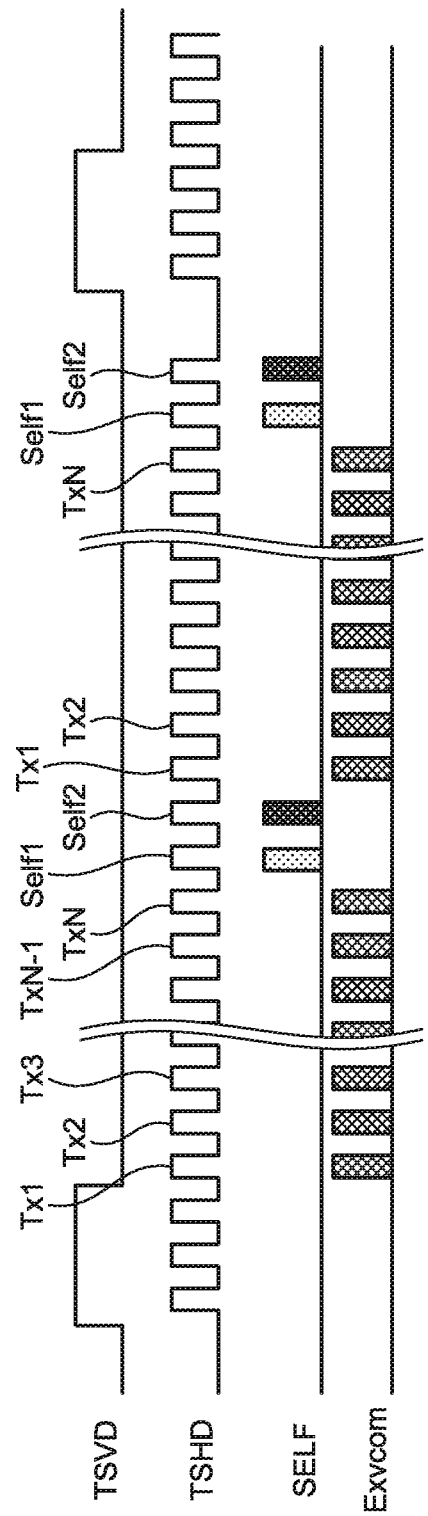
FIG. 17 is a timing diagram of the case where the second touch detection of the second group is performed.

FIG. 16 is a schematic diagram illustrating the case where the second touch detection of the second group GB is performed. FIG. 17 is a timing diagram of the case where the second touch detection of the second group GB is performed. In the example illustrated in FIG. 16, the touch operation is performed in the region of the second group GB. As a result, the touch operation is detected by the first touch detection of the second group GB. In this case, the second touch detection of the second group GB is performed. In contrast, no touch operation is performed in the region of the first group GA in the example illustrated in FIG. 16. As a result, no touch operation is detected by the first touch detection of the first group GA. In this case, the second touch detection of the first group GA is not performed.

In the example illustrated in FIGS. 16 and 17, the detection electrodes Rx included in the second group GB remain to be coupled to the detection circuit 51 by the selection circuit 52 during the period in which the detection surface is scanned. As a result, the second touch detection of the second group GB is performed. In the case of the example illustrated in FIGS. 16 and 17, a report rate of the second touch detection of the second group GB is 120 Hz. As illustrated by the examples described above, if the self-capacitance in response to the touch operation is detected by one or more detection electrodes Rx included in one of the groups, the selection circuit 52 selects and couples the detection electrodes Rx included in such one of the groups to the detection circuit 51 at the time of the second touch detection.

Figure 18:
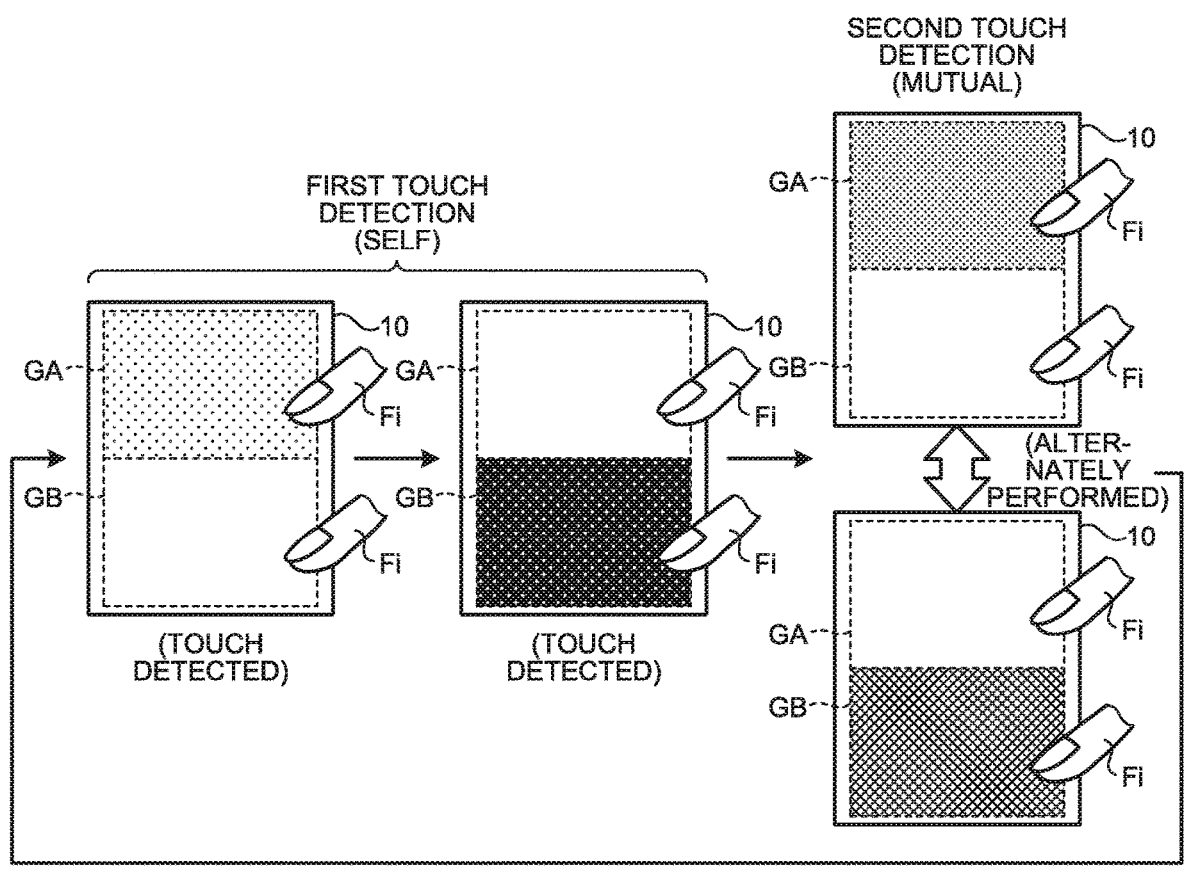
FIG. 18 is a schematic diagram illustrating a case where the second touch detection of the first group and the second touch detection of the second group are performed.
Figure 19:
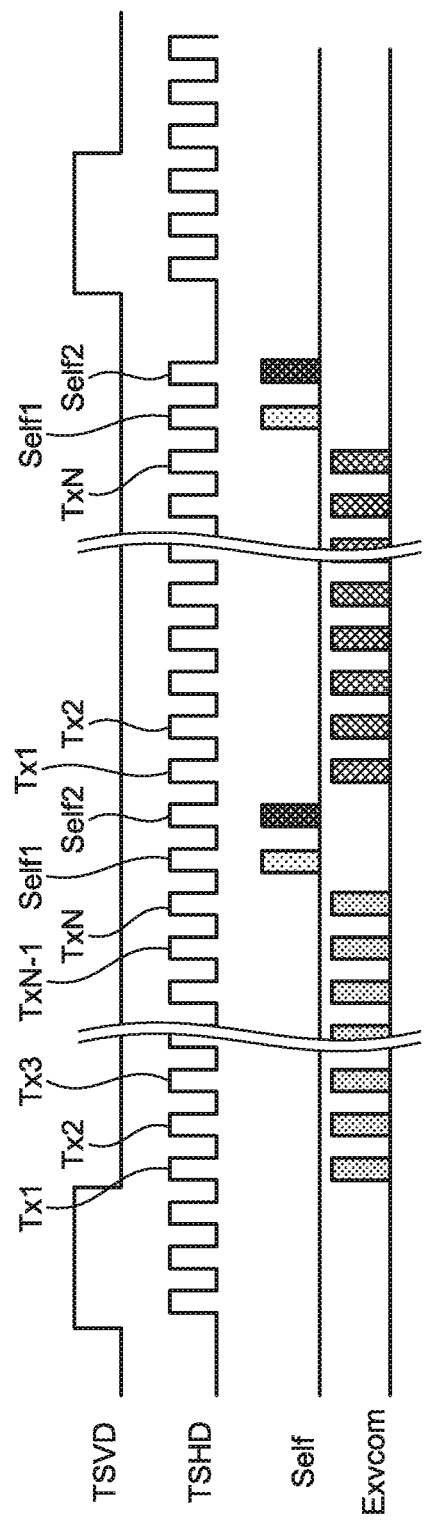
FIG. 19 is a timing diagram of the case where the second touch detection of the first group and the second touch detection of the second group are performed.

FIG. 18 is a schematic diagram illustrating the case where the second touch detection of the first group GA and the second touch detection of the second group GB are performed. FIG. 19 is a timing diagram of the case where the second touch detection of the first group GA and the second touch detection of the second group GB are performed. In the example illustrated in FIG. 18, the touch operation is performed in the region of the first group GA and the region of the second group GB. As a result, the touch operation is detected by both the first touch detection of the first group GA and the first touch detection of the second group GB. In this case, the second touch detection of the first group GA and the second touch detection of the second group GB are alternately performed. In the example illustrated in FIGS. 18 and 19, the group of the detection electrodes Rx coupled to the detection circuit 51 is alternately switched between the first group GA and the second group GB across the output timing of the pulses Self1 and Self2. In the case of the example illustrated in FIGS. 18 and 19, the report rate of each of the second touch detection of the first group GA and the second touch detection of the second group GB is 60 Hz, resulting in a total report rate of 120 Hz. As described above, the detection electrodes Rx that generate the mutual capacitance with the drive electrodes Tx are the detection electrodes Rx in the group including the detection electrodes Rx where the self-capacitance in response to the touch operation has been detected.

Figure 20:
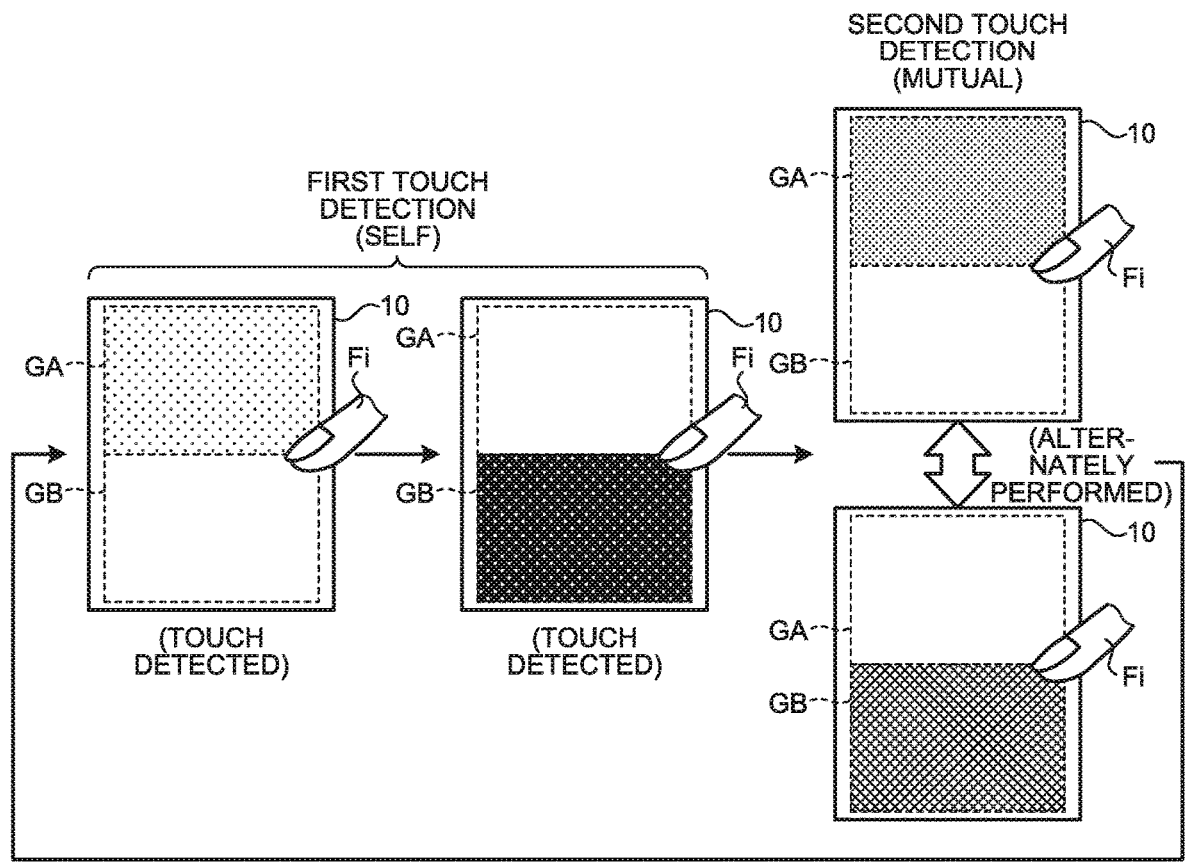
FIG. 20 is a schematic diagram illustrating another case where the second touch detection of the first group and the second touch detection of the second group are performed.

FIG. 20 is a schematic diagram illustrating another case where the second touch detection of the first group GA and the second touch detection of the second group GB are performed. As illustrated in FIG. 20, a case can also occur where a touch operation at one location causes the touch operation to be detected both in the region of the first group GA and in the region of the second group GB. In such a case, the second touch detection of the first group GA and the second touch detection of the second group GB are alternately performed in the same manner as in the case described with reference to FIGS. 18 and 19.

As described above, according to the first embodiment, the detection electrodes Rx are coupled to the detection circuit 51 through the selection circuit 52 configured to select the first predetermined number or less of the detection electrodes Rx from the second predetermined number of the detection electrodes Rx. As a result, the touch operation can be detected with a smaller number of the input channels of the detection circuit 51 than the number of the detection electrodes Rx.

The second predetermined number of the detection electrodes Rx are grouped into a plurality of groups each including from one to the first predetermined number of the detection electrodes Rx, by the selection of the detection electrodes Rx performed by the selection circuit 52. Consequently, the detection electrodes Rx to be coupled to the detection circuit 51 can be selected on a group-by-group basis. As a result, control related to the selection of the detection electrodes Rx can be simplified.

Each of the detection electrodes Rx is selected by the selection circuit 52 as one of the detection electrodes Rx included in any one group (such as either one of the first group GA or the second group GB). Accordingly, if any one of the detection electrodes Rx has detected the touch operation, one of the groups can be identified that includes the detection electrode Rx that has detected the touch operation.

Since the first touch detection is sequentially performed on a group-by-group basis, the detection electrodes Rx to be coupled to the detection circuit 51 can be selected on a group-by-group basis during the period in which the first touch detection is performed. As a result, the control related to the selection of the detection electrodes Rx can be simplified.

If the first touch detection is performed at the predetermined period and the self-capacitance in response to the touch operation is detected by the first touch detection at one or more of the detection electrodes Rx, the second touch detection is performed at the time when the first touch detection is not performed. As a result, the second touch detection can be performed in the case where more accurate touch operation based on the mutual capacitance is needed, and can be omitted in other cases. Accordingly, power consumption of the touch detection device 1 can be more easily reduced. In addition, the first embodiment can achieve a higher report rate (such as 120 Hz).

Second Embodiment

The following describes a second embodiment of the present invention. In the description of the second embodiment, the same components as those in the first embodiment are assigned with the same reference numerals, and description thereof will not be given.

Figure 21:
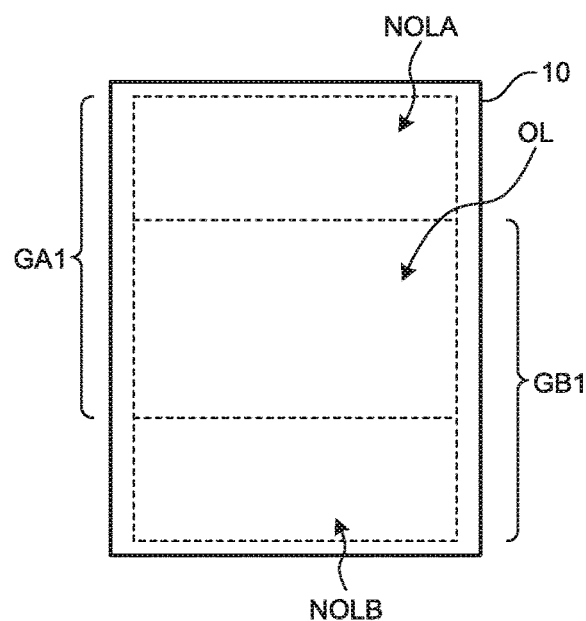
FIG. 21 is a schematic diagram illustrating exemplary groups of the detection electrodes in a second embodiment of the present invention.

FIG. 21 is a schematic diagram illustrating exemplary groups of the detection electrodes Rx in the second embodiment. In the first embodiment, the selection circuit 52 selects each of the detection electrodes Rx as one of the detection electrodes Rx included in one of the groups. In contrast, in the second embodiment, one or more detection electrodes Rx among detection electrodes Rx included in one of the groups selected by the selection circuit 52 are also included in another one of the groups.

Specifically, as illustrated, for example, in FIG. 21, the selection circuit 52 in the second embodiment selects the first predetermined number of the detection electrodes Rx as the detection electrodes Rx included in at least one of two groups (a first group GA1 and a second group GB1). The region of the first group GA1 partially overlaps the region of the second group GB1. In FIG. 21, a first non-overlap region NOLA and a second non-overlap region NOLB are located so as to interpose therebetween an overlap region OL between the region of the first group GA1 and the region of the second group GB1. The first non-overlap region NOLA is a region of the first group GA1 not overlapping the region of the second group GB1. The second non-overlap region NOLB is a region of the second group GB1 not overlapping the region of the first group GA1. The detection electrodes Rx disposed in the overlap region OL are included in the two groups of the first group GA1 and the second group GB1. The detection electrodes Rx disposed in the first non-overlap region NOLA are included in the first group GA1. The detection electrodes Rx disposed in the first non-overlap region NOLA are included in the first group GA1 but not included in the second group GB1. The detection electrodes Rx disposed in the second non-overlap region NOLB are included in the second group GB1 but not included in the first group GA1.

Assuming the number of the detection electrodes Rx to be 96, the following gives an example of numbers of the detection electrodes Rx in the respective regions. The number of the detection electrodes Rx located in the region of the first group GA1 is 68. The number of the detection electrodes Rx located in the region of the second group GB1 is 68. The number of the detection electrodes Rx located in the region of the overlap region OL is 40. The number of the detection electrodes Rx located in each of the first and second non-overlap regions NOLA and NOLB is 28. That is, in the case of this example, the first group GA1 and the second group GB1 share the 40 detection electrodes Rx. The detection electrodes Rx located in the region of the overlap region OL are, for example, the 40 detection electrodes Rx located in the middle in the Y-direction of the detection surface. This is, however, a mere arrangement example of the region of the overlap region OL. The arrangement thereof is not limited to this example. The number and the locations of the detection electrodes Rx in each of the regions can be freely set. The number of the detection electrodes Rx simultaneously couplable to the detection circuit 51 and the number of the detection electrodes Rx selectable by the selection circuit 52 correspond to the number of the detection electrodes Rx included in one group (68 in the case of this example).

Figure 22:
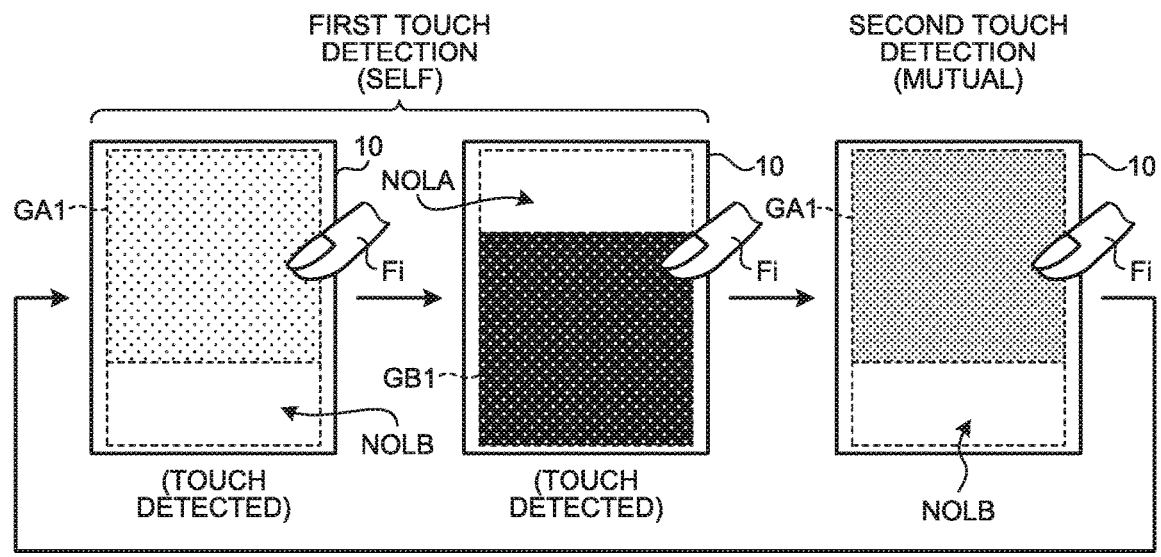
FIG. 22 is a schematic diagram illustrating an exemplary case where a touch operation is detected in an overlap region.
Figure 23:
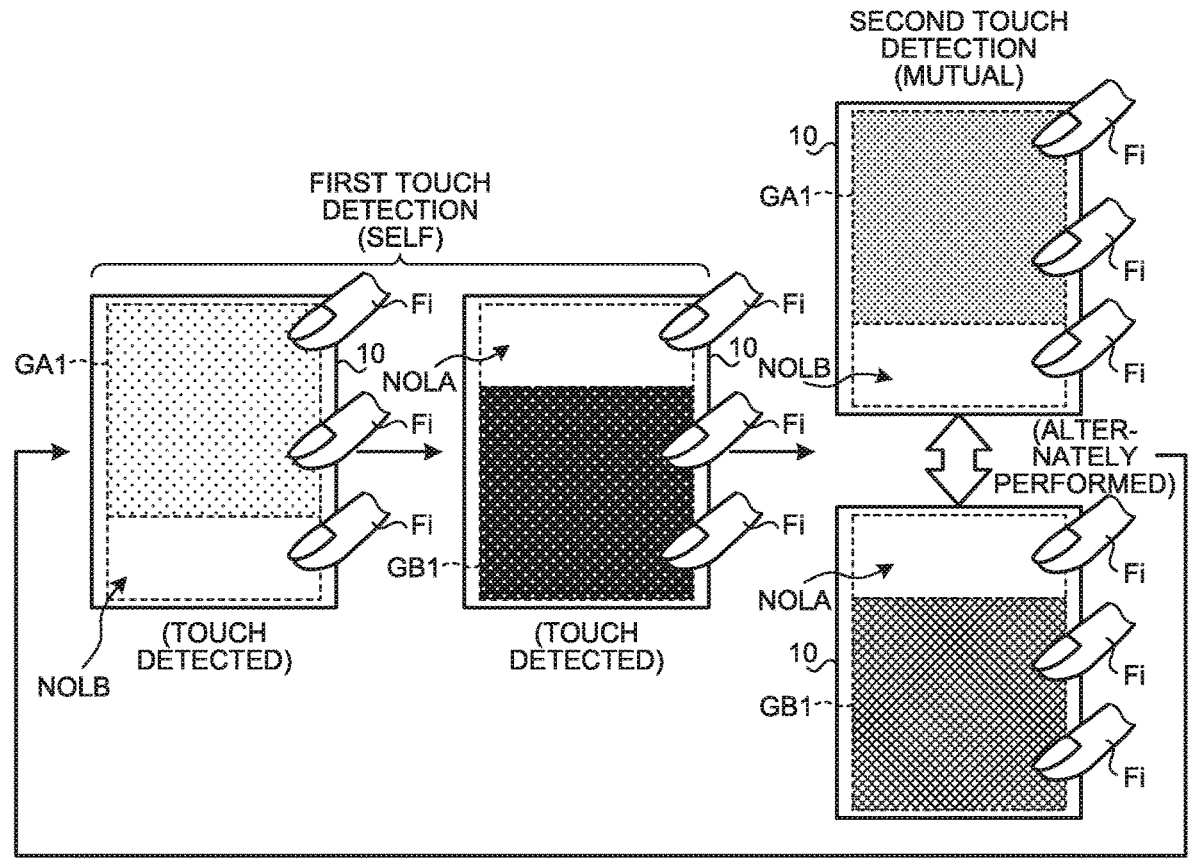
FIG. 23 is a schematic diagram illustrating an exemplary case where the touch operation is detected in the overlap region, a first non-overlap region, and a second non-overlap region.

FIG. 22 is a schematic diagram illustrating an exemplary case where the touch operation is detected in the overlap region OL. FIG. 23 is a schematic diagram illustrating an exemplary case where the touch operation is detected in the overlap region OL and the first and second non-overlap regions NOLA and NOLB. In the second embodiment, if the touch operation is detected in the overlap region OL by the first touch detection, the group to be subjected to the second touch detection is determined depending on whether the touch operation is detected in the first non-overlap region NOLA and whether the touch operation is detected in the second non-overlap region NOLB.

For example, as illustrated in FIG. 22, if the touch operation is detected in the overlap region OL and detected in neither the first non-overlap region NOLA nor the second non-overlap region NOLB by the first touch detection, either the second touch detection of the first group GA1 or the second touch detection of the second group GB1 is performed. This is because the second touch detection of the overlap region OL can be performed by performing either the second touch detection of the first group GA1 or the second touch detection of the second group GB1. Although FIG. 22 illustrates the case of performing the second touch detection of the first group GA1, the second touch detection of the second group GB1 may be performed. In this case, the timing diagram is the same as FIG. 15 that is referred to in the description of the first embodiment. However, the first group GA in the first embodiment is replaced with the first group GA1 (or the second group GB1) in the second embodiment.

As illustrated in FIG. 23, if the touch operation is detected in the overlap region OL and the first and second non-overlap regions NOLA and NOLB, the second touch detection of the first group GA1 and the second touch detection of the second group GB1 are alternately performed. In this case, the timing diagram is the same as FIG. 19 that is referred to in the description of the first embodiment. However, the first group GA and the second group GB in the first embodiment are replaced with the first group GA1 and the second group GB1 in the second embodiment.

If the touch operation is detected in either the first non-overlap region NOLA or the second non-overlap region NOLB and not detected in the other thereof by the first touch detection, a group including the region where the touch operation has been detected serves as a group to be subjected to the second touch detection. In the same manner as in the first embodiment, for example, the arithmetic unit 53 performs various types of processing related to the touch detection, such as a determination as to whether the position where the touch operation is detected by the first touch detection is in the overlap region OL. The second embodiment is the same as the first embodiment except in the features described above.

According to the second embodiment, one or more of the detection electrodes Rx selected by the selection circuit 52 as detection electrodes Rx included in one of the groups (such as either the first group GA1 or the second group GB1) are also included in another one of the groups. As a result, the touch operation can be more reliably detected by including the detection electrodes Rx located in a position where the touch operation can be more easily performed in the two groups.

In some cases, the self-capacitance in response to the touch operation is detected by the detection electrodes Rx included in the two groups (such as the detection electrodes Rx in the overlap region OL). In such cases, the detection electrodes Rx included in either one of the two groups serve as the detection electrodes Rx that generate the mutual capacitance with the drive electrodes Tx. As a result, the frequency of switching of the detection electrodes Rx can be minimized, and the control related to the switching of the detection electrodes Rx can be simplified.

Third Embodiment

The following describes a third embodiment of the present invention. In the description of the third embodiment, the same components as those in the first embodiment are assigned with the same reference numerals, and description thereof will not be given.

Figure 24:
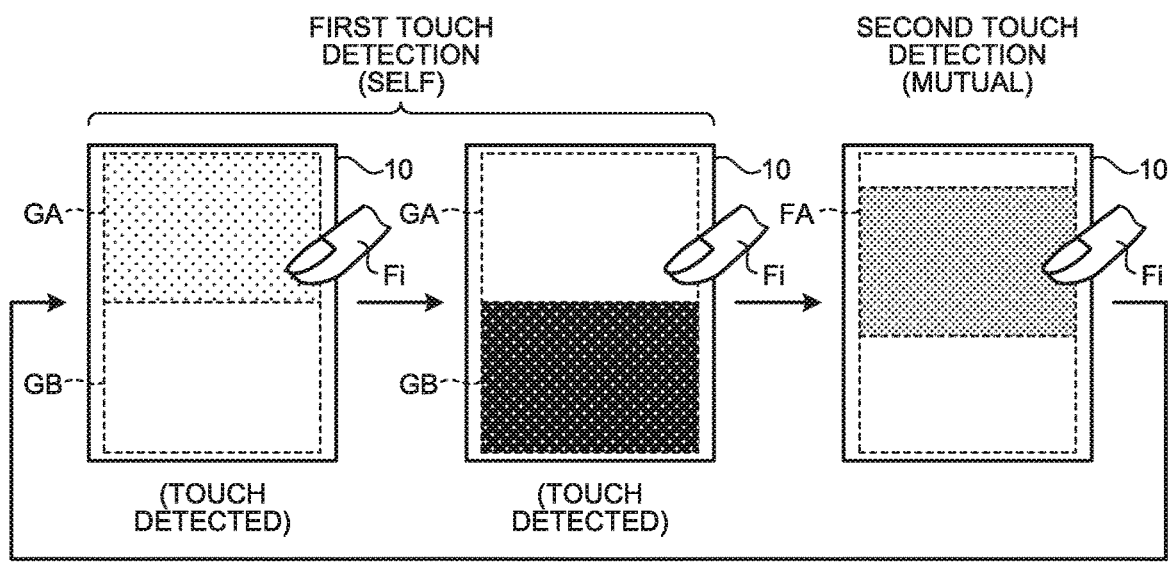
FIG. 24 is a diagram illustrating an exemplary region where the second touch detection is performed in a third embodiment of the present invention.
Figure 25:
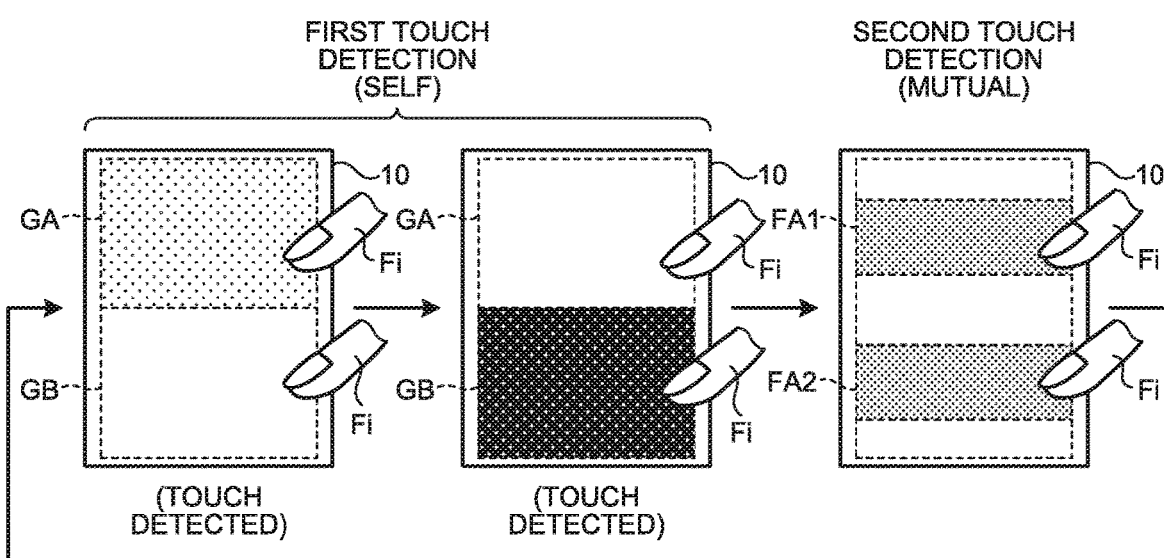
FIG. 25 is a diagram illustrating other exemplary regions where the second touch detection is performed in the third embodiment.

FIG. 24 is a diagram illustrating an exemplary region where the second touch detection is performed in the third embodiment. FIG. 25 is a diagram illustrating other exemplary regions where the second touch detection is performed in the third embodiment. In the third embodiment, the detection electrodes Rx used for the second touch detection have no relation with the groups of the detection electrodes Rx. The detection electrodes Rx used for the second touch detection include the detection electrodes Rx where a change in the self-capacitance has been detected by the first touch detection performed for all the groups. The number of the detection electrodes Rx used for the second touch detection is equal to or smaller than the first predetermined number. Specifically, as illustrated in FIG. 24, if the first touch detection has detected a touch operation at only one location when viewed in the arrangement direction of the detection electrodes Rx (such as the Y-direction), the second touch detection is performed for the detection electrodes Rx corresponding to a continuous region FA including such one location. As illustrated in FIG. 25, the first touch detection detects a touch operation at a plurality of locations (such as two locations) when viewed in the arrangement direction of the detection electrodes Rx (such as the Y-direction), in some cases. In such cases, the second touch detection is performed for the detection electrodes Rx corresponding to a plurality of predetermined regions (such as regions FA1 and FA2) each including a corresponding one of the locations. As illustrated by the examples described above, the arithmetic unit 53 in the third embodiment performs a free area scan. The free area scan refers to processing to dynamically extract detection electrodes Rx including the detection electrodes Rx where a change in the self-capacitance has been detected by the first touch detection, and perform the second touch detection using the extracted detection electrodes Rx. According to the processing performed by the arithmetic unit 53, the selection circuit 52 selects the detection electrodes Rx including the detection electrodes Rx where the self-capacitance has been detected by the first touch detection.

In the third embodiment, the number of the detection electrodes Rx selected for the second touch detection is equal to or smaller than the first predetermined number. That is, the number of the detection electrodes Rx corresponding to the continuous region FA is equal to or smaller than the first predetermined number. The number obtained by adding the number of detection electrodes Rx corresponding to the region FA1 to the number of detection electrodes Rx corresponding to the region FA2 is equal to or smaller than the first predetermined number.

As illustrated by the example depicted in FIG. 25, a continuous region similar to the continuous region FA (refer to FIG. 24) may hardly or may not include two locations in each of which the touch operation is detected by the first touch detection. In this case, the second touch detection is performed using the detection electrodes Rx corresponding to the two regions FA1 and FA2. If the continuous region FA can include the locations in each of which the touch operation is detected by the first touch detection, the second touch detection may be performed for the detection electrodes Rx corresponding to the continuous region FA including the locations. The third embodiment is the same as the first embodiment except in the features described above.

According to the third embodiment, the detection electrodes Rx to be selected in the period of performing the second touch detection are determined according to the position where the touch operation has been detected by the first touch detection. As a result, the accuracy of detection can be easily increased near the position where the touch operation has been detected.

Fourth Embodiment

The following describes a fourth embodiment of the present invention. In the description of the fourth embodiment, the same components as those in the first or second embodiment are assigned with the same reference numerals, and description thereof will not be given.

Figure 26:
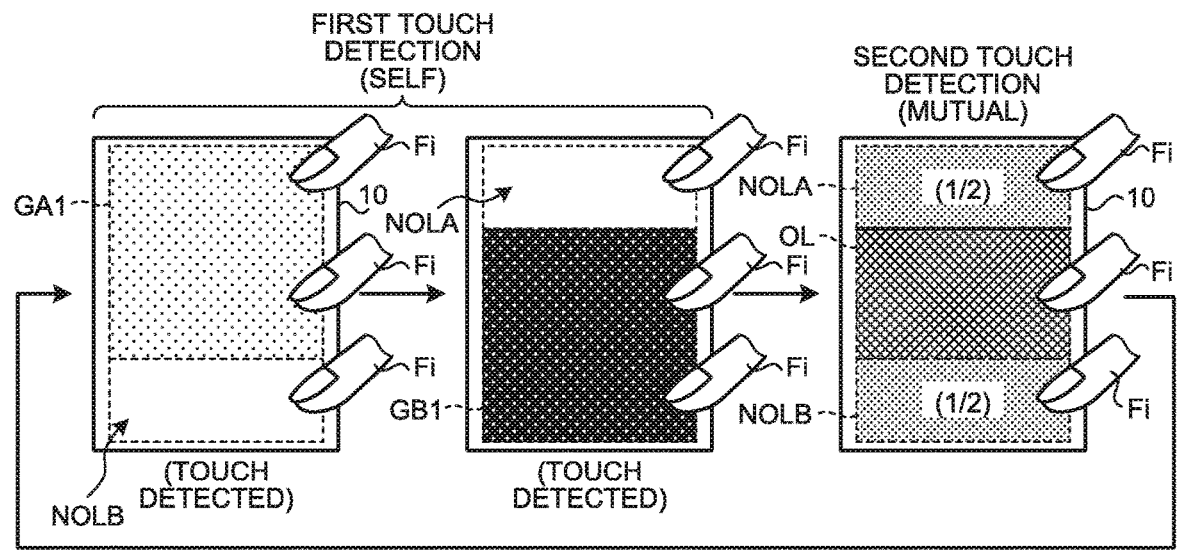
FIG. 26 is a schematic diagram illustrating an exemplary case where the touch operation is detected in the overlap region and the first and second non-overlap regions in a fourth embodiment of the present invention.

FIG. 26 is a schematic diagram illustrating an exemplary case where the touch operation is detected in the overlap region OL and the first and second non-overlap regions NOLA and NOLB in the fourth embodiment. In the fourth embodiment, each of two of the groups includes the detection electrodes Rx where the self-capacitance in response to the touch operation has been detected, some of the detection electrodes Rx are included in (belong to) only one of the two groups, and some of the detection electrodes Rx are included in (belong to) only the other one of the two groups, in some cases. In such a case, the selection circuit 52 selects and couples all the detection electrodes Rx included in the two groups, first selected electrodes, and second selected electrodes at the time of the second touch detection. The first selected electrodes are some of the detection electrodes Rx included in (belonging to) only one of the two groups. The second selected electrodes are some of the detection electrodes Rx included in (belonging to) only the other of the two groups. The term "detection electrodes Rx included in (belonging to) only one group" refers to the detection electrodes Rx that are selected by the selection circuit 52 when one of the groups is used for the touch detection, and that are not selected when the other of the groups is used for the touch detection.

FIG. 26 illustrates the case where the touch operation is detected in the overlap region OL and the first and second non-overlap regions NOLA and NOLB. In this case, the second touch detection of the overlap region OL and the second touch detection using the some of the detection electrodes Rx in the other regions are performed at the same time. The term "some of the detection electrodes Rx in the other regions" refers to some of the detection electrodes Rx among the detection electrodes Rx included in the first and second non-overlap regions NOLA and NOLB. In this case, the timing diagram is the same as FIG. 15 that is referred to in the description of the first embodiment. However, the first group GA in the first embodiment is replaced with a combination of the overlap region OL and parts of the first and second non-overlap regions NOLA and NOLB. The "detection electrodes Rx located in the region of the overlap region OL" correspond to "all the detection electrodes Rx included in the two groups". The "some of the detection electrodes Rx among the detection electrodes Rx located in the first non-overlap region NOLA" among the electrodes used for the second touch detection correspond to "the first selected electrodes". The "some of the detection electrodes Rx among the detection electrodes Rx located in the second non-overlap region NOLB" among the electrodes used for the second touch detection correspond to "the second selected electrodes".

The first selected electrodes are the detection electrodes Rx located in odd-numbered (or even-numbered) positions from one end side toward the other end side in the second direction (Y-direction) among a plurality of (such as 28) detection electrodes Rx arranged along Y-direction in the first non-overlap region NOLA. The second selected electrodes are the detection electrodes Rx located in odd-numbered (or even-numbered) positions from one end side toward the other end side in the Y-direction among a plurality of (such as 28) detection electrodes Rx arranged along Y-direction in the second non-overlap region NOLB. As illustrated by these examples, the first and second selected electrodes are detection electrodes Rx alternately selected along the order of arrangement from among two or more of the detection electrodes Rx consecutively arranged along the second direction (Y-direction). FIG. 26 uses a notation "½" to indicate that the odd-numbered (or even-numbered) detection electrodes Rx are selected from among the detection electrodes Rx located in the first and second non-overlap regions NOLA and NOLB.

In the fourth embodiment, the number of the detection electrodes Rx simultaneously couplable to the detection circuit 51 and the number of the detection electrodes Rx selectable by the selection circuit 52 correspond to a number obtained by summing the numbers of "all the detection electrodes Rx included in the two groups", the "first selected electrodes", and the "second selected electrodes". Assuming that the number of the detection electrodes Rx located in the overlap region OL and the number of the detection electrodes Rx located in each of the first and second non-overlap regions NOLA and NOLB in the fourth embodiment are the same as those in the second embodiment, the number obtained by summing the above-described numbers is represented as $40+(28\times\frac{1}{2})+(28\times\frac{1}{2})=68$. The fourth embodiment is the same as the second embodiment except in the features described above.

The fourth embodiment can satisfy both the resolution and the report rate of the touch detection in the region where the detection electrodes Rx included in the two groups are located. The fourth embodiment can also set the report rate of the touch detection in the regions where the first and second selected electrodes are located equal to that in the region where the detection electrodes Rx included in the two groups are located.

Fifth Embodiment

The following describes a fifth embodiment of the present invention. In the description of the fifth embodiment, the same components as those in the first, second, or fourth embodiment are assigned with the same reference numerals, and description thereof will not be given.

Figure 27:
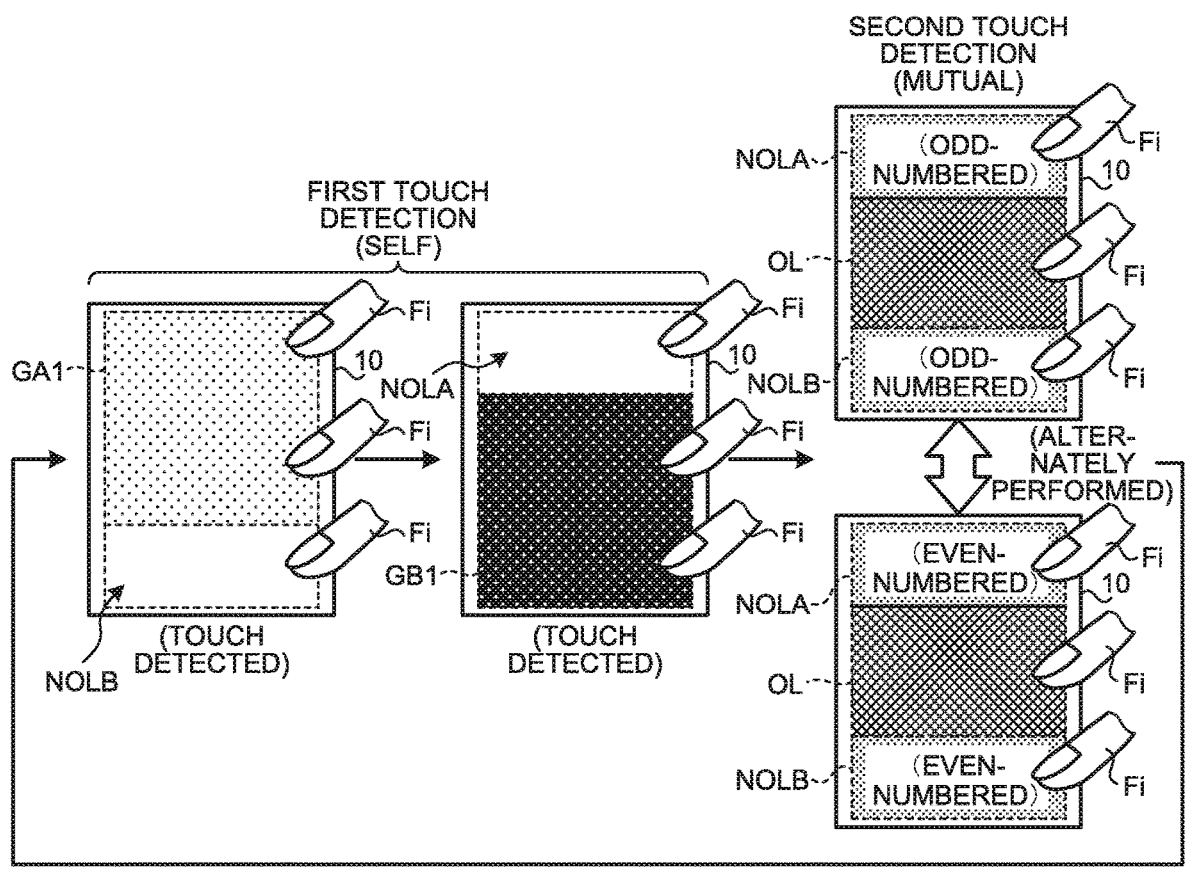
FIG. 27 is a schematic diagram illustrating an exemplary case where the touch operation is detected in the overlap region and the first and second non-overlap regions in a fifth embodiment of the present invention.

FIG. 27 is a schematic diagram illustrating an exemplary case where the touch operation is detected in the overlap region OL and the first and second non-overlap regions NOLA and NOLB in the fifth embodiment. In the fifth embodiment, the second touch detection is performed at a plurality of times, and periods of selection of the first and second selected electrodes are shifted from each other such that different ones of the detection electrodes Rx are used for the second touch detections performed at the two closest times to each other among the plurality of times. Specifically, the term "the second touch detections performed at the two closest times to each other among the plurality of times" refers to, for example, two second touch detections performed immediately before and immediately after the timing (Self1 and Self2) when the first touch detection is performed. The "first selected electrodes" used at one of the two times of the second touch detection are the detection electrodes Rx located in the odd-numbered positions from one end side toward the other end side in the second direction (Y-direction) among a plurality of (such as 24) detection electrodes Rx arranged along the Y-direction in the first non-overlap region NOLA. The "first selected electrodes" used at the other of the two times of the second touch detection are the detection electrodes Rx located in even-numbered positions from one end side toward the other end side in the second direction (Y-direction) among a plurality of (such as 24) detection electrodes Rx arranged along the Y-direction in the first non-overlap region NOLA. The relation between each of the two times of the second touch detection and the "second selected electrodes" is the same as that in the case of the "first selected electrodes", so that the second selected electrodes are switched between the odd-numbered and even-numbered detection electrodes Rx, in the same manner as in the case of the "first selected electrodes". In this case, the timing diagram is the same as FIG. 19 that is referred to in the description of the first embodiment. However, the first group GA and the second group GB in the first embodiment are replaced with a "first selection pattern" and a "second selection pattern" in the fifth embodiment. The "first selection pattern" is a pattern of selecting the "detection electrodes Rx located in a region in the overlap region OL" and the "odd-numbered detection electrodes Rx located in regions in the first and second non-overlap regions NOLA and NOLB". The "second selection pattern" is a pattern of selecting the "detection electrodes Rx located in a region in the overlap region OL" and the "even-numbered detection electrodes Rx located in regions in the first and second non-overlap regions NOLA and NOLB". The fifth embodiment is the same as the fourth embodiment except in the features described above.

The fifth embodiment can satisfy both the resolution and the report rate of the touch detection in the region where the detection electrodes Rx included in the two groups are located. The fifth embodiment can also set the report rate of the touch detection in the regions where the first and second selected electrodes are located equal to that in the region where the detection electrodes Rx included in the two groups are located.

Sixth Embodiment

The following describes a sixth embodiment of the present invention. In the description of the sixth embodiment, the same components as those in any one of the first to fifth embodiments are assigned with the same reference numerals, and description thereof will not be given.

Figure 28:
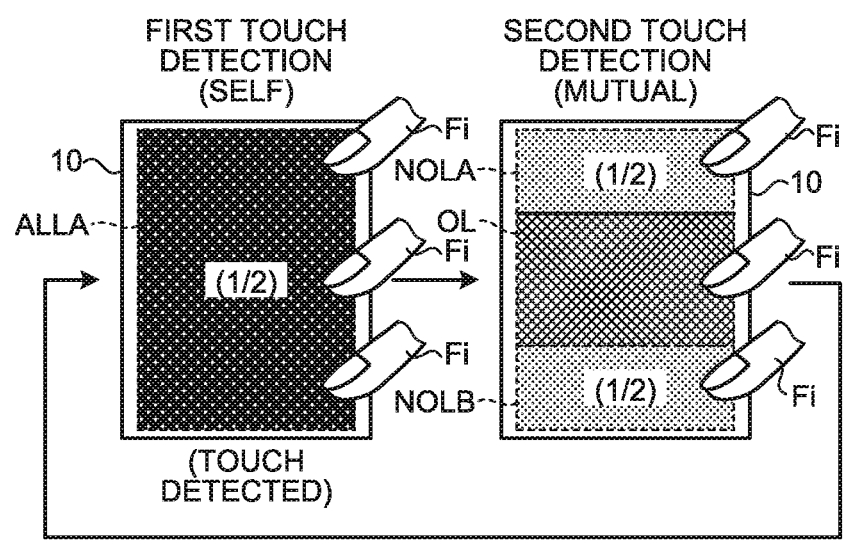
FIG. 28 is a schematic diagram illustrating an exemplary case where the touch operation is detected in the overlap region and the first and second non-overlap regions in a sixth embodiment of the present invention.
Figure 29:
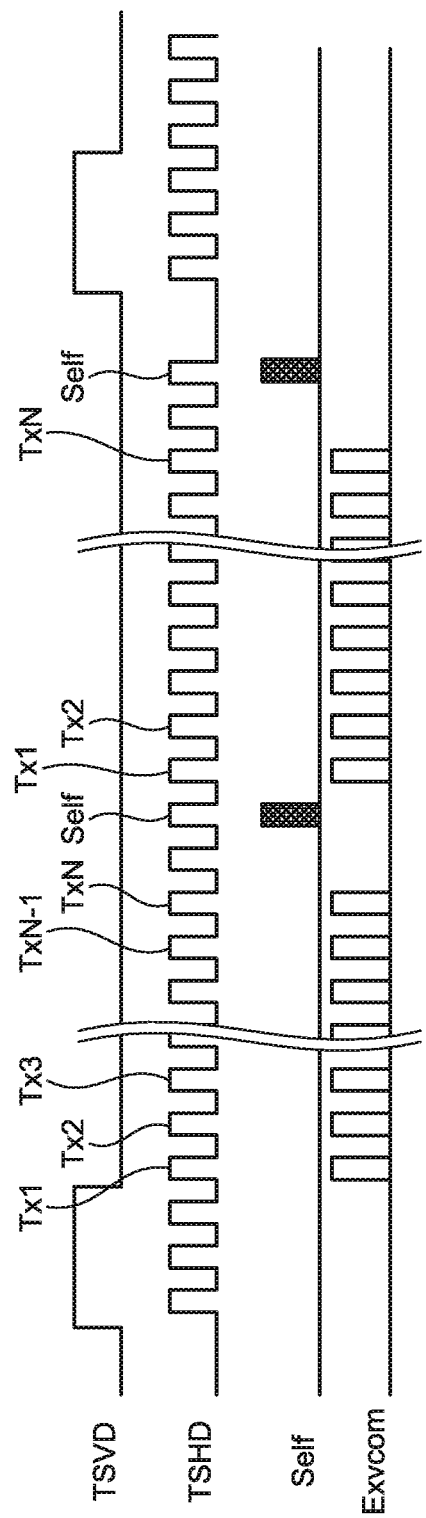
FIG. 29 is a timing diagram illustrating exemplary timing of performing the first touch detection in the sixth embodiment.

FIG. 28 is a schematic diagram illustrating an exemplary case where the touch operation is detected in the overlap region OL and the first and second non-overlap regions NOLA and NOLB in the sixth embodiment. FIG. 29 is a timing diagram illustrating exemplary timing of performing the first touch detection in the sixth embodiment. The detection electrodes Rx selected for the first touch detection in the sixth embodiment differ from those in the first to fifth embodiments.

Specifically, in the sixth embodiment, for example, of all the detection electrodes Rx, the detection electrodes Rx located in odd-numbered (or even-numbered) positions from one end side toward the other end side in the Y-direction are selected for the first touch detection. FIG. 28 uses a notation "½" to indicate that the odd-numbered (or even-numbered) detection electrodes Rx are selected from among the detection electrodes Rx located in the touch detection region ALLA.

In the first to fifth embodiments, the detection electrodes Rx are sequentially selected on a group-by-group basis during the first touch detection. In contrast, in the sixth embodiment, as illustrated in FIGS. 28 and 29, the detection electrodes Rx selected for the first touch detection have no relation with the groups of the detection electrodes Rx. In the sixth embodiment, the first touch detection of the touch detection region ALLA is performed by performing once the first touch detection in the state where the detection electrodes Rx located in the odd-numbered (or even-numbered) positions from one end side toward the other end side in the Y-direction are selected. In the sixth embodiment, unlike in the first embodiment, one of a predetermined number of outputs of the second synchronizing signals TSHD is uselessly output. In the sixth embodiment, this uselessly output second synchronizing signal TSHD may be removed.

Although FIG. 28 illustrates a combination of the first touch detection in the sixth embodiment and the second touch detection in the fourth embodiment, the scope of application of the first touch detection in the sixth embodiment is not limited to this example. The first touch detection in the sixth embodiment can be applied to any of the first to fifth embodiments. The sixth embodiment is the same as the first to fifth embodiments except in that the detection electrodes Rx selected for the first touch detection do not depend on the group of the detection electrodes Rx used for the second touch detection.

The sixth embodiment can enlarge the region covered by performing the first touch detection. The sixth embodiment can also reduce the frequency of performing the first touch detection, and thus can reduce the power consumption of the touch detection device 1.

Seventh Embodiment

The following describes a seventh embodiment of the present invention. In the description of the seventh embodiment, the same components as those in any one of first to fifth embodiments are assigned with the same reference numerals, and description thereof will not be given.

Figure 30:
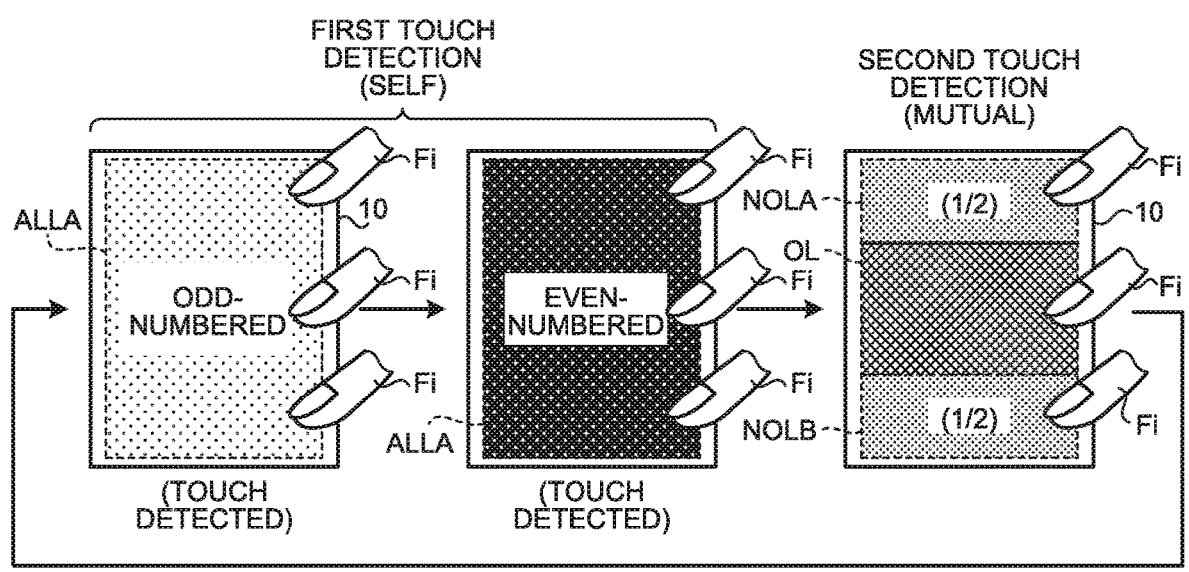
FIG. 30 is a schematic diagram illustrating an exemplary case where the touch operation is detected in the overlap region and the first and second non-overlap regions in a seventh embodiment of the present invention.

FIG. 30 is a schematic diagram illustrating an exemplary case where the touch operation is detected in the overlap region OL and the first and second non-overlap regions NOLA and NOLB in the seventh embodiment. In the seventh embodiment, the groups of the detection electrodes Rx are selected in two selection patterns. One of the two patterns is that of first groups for detecting the self-capacitance of the detection electrodes Rx. The other of the two patterns is that of second groups for detecting the mutual capacitance of the detection electrodes Rx. The second groups are the same as the groups of the detection electrodes Rx in the first to fifth embodiments, and therefore will not be described.

The positions of the detection electrodes Rx included in each of the first groups differ from those of the detection electrodes Rx included in each of the second groups. Specifically, the number of the first groups is two, as illustrated, for example, in FIG. 30. The detection electrodes Rx included in one of the two groups serving as the first groups are, for example, the detection electrodes Rx located in the odd-numbered positions from one end side toward the other end side in the Y-direction among all the detection electrodes Rx. The detection electrodes Rx included in the other of the two groups are, for example, the detection electrodes Rx located in the even-numbered positions from one end side toward the other end side in the Y-direction among all the detection electrodes Rx. In the seventh embodiment, each of the detection electrodes Rx included in one of the two groups serving as the first groups is selected at the time of one of the pulse Self1 and the pulse Self2 of the second synchronizing signal TSHD, and each of the detection electrodes Rx included in the other of the two groups serving as the first groups is selected at the time of the other of the pulse Self1 and the pulse Self2 of the second synchronizing signal TSHD (refer, for example, to FIG. 13). The second touch detection in the seventh embodiment is the same as the second touch detection, for example, in the fourth embodiment.

FIG. 30 illustrates a combination of the first touch detection in the seventh embodiment and the second touch detection in the fourth embodiment. However, the scope of application of the first touch detection in the seventh embodiment is not limited to this example. The first touch detection in the seventh embodiment can be applied to any of the first to fifth embodiments. The seventh embodiment is the same as the first to fifth embodiments except in that the groups of the detection electrodes Rx used for the first touch detection differ from the groups of the detection electrodes Rx used for the second touch detection. That is, in the seventh embodiment, if one or more of the detection electrodes Rx have detected the self-capacitance in response to the touch operation during the first touch detection, the second touch detection is performed based on the mutual capacitance of the detection electrodes Rx in the second groups including the one or more of the detection electrode Rx.

The seventh embodiment enables independent selection of the groups for the first touch detection and the groups for the second touch detection. As a result, the seventh embodiment enables use of different types of selection, one being selection of the detection electrodes Rx more suitable for roughly identifying the position of the touch operation by the first touch detection, and the other being selection of the detection electrodes Rx more suitable for more accurately identifying the position of the touch operation by the second touch detection.

Eighth Embodiment

The following describes an eighth embodiment of the present invention. In the description of the eighth embodiment, the same components as those in the first embodiment are assigned with the same reference numerals, and description thereof will not be given.

Figure 31:
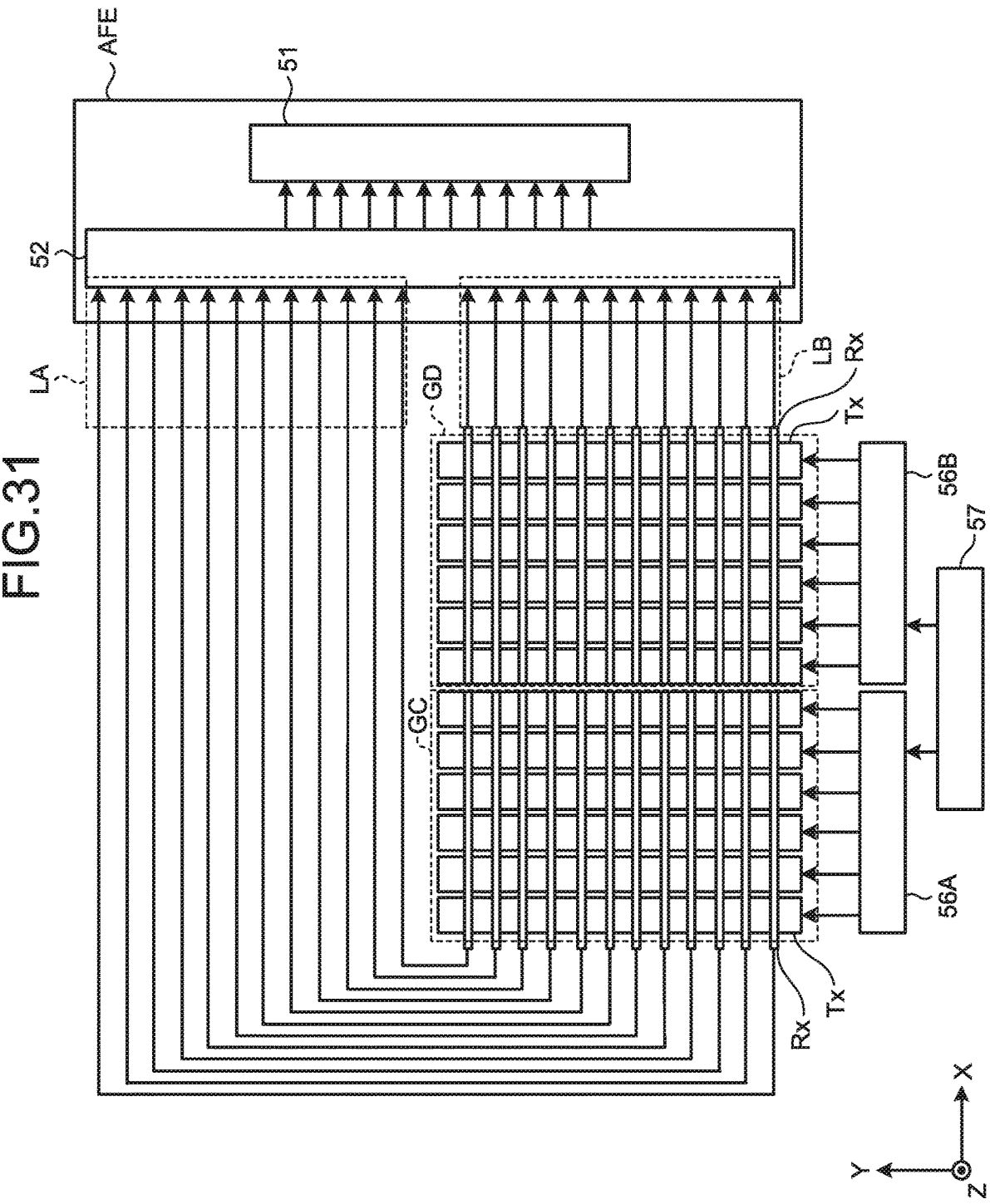
FIG. 31 is a plan view illustrating an exemplary positional relation between the drive electrodes and the detection electrodes included in a touch detection panel according to an eighth embodiment of the present invention.
Figure 33:
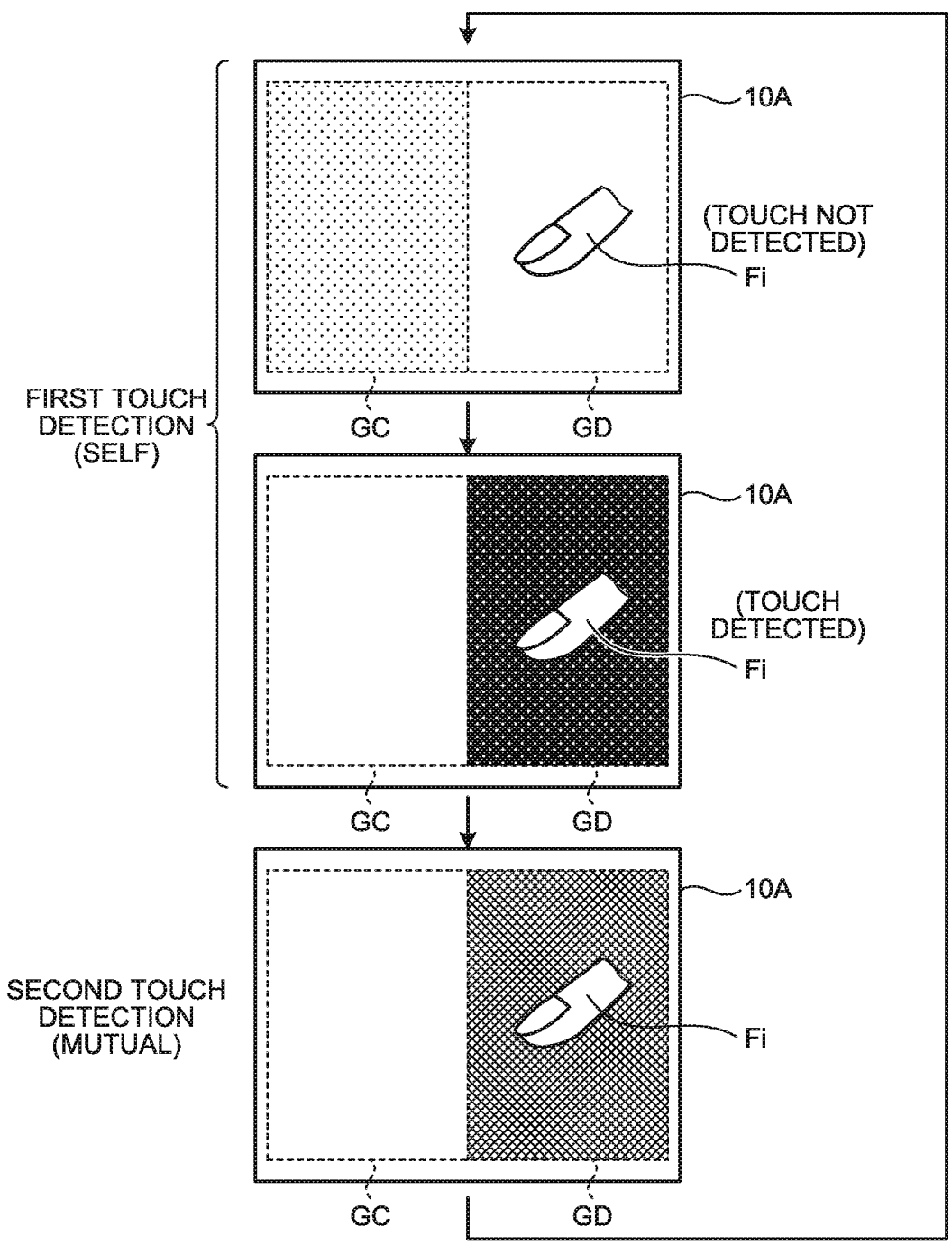
FIG. 33 is a schematic diagram illustrating a case where the second touch detection of a second group is performed.

FIG. 31 is a plan view illustrating an exemplary positional relation between the drive electrodes Tx and the detection electrodes Rx included in a touch detection panel 10A of the eighth embodiment (refer to FIG. 33). In the eighth embodiment, the detection electrodes Rx in different groups are opposed to different sets of the drive electrodes Tx. Specifically, in the eighth embodiment, the drive electrodes Tx are individually provided for the respective groups of the detection electrodes Rx. In other words, in the eighth embodiment, the same number of groups of the drive electrodes Tx as the number of groups of the detection electrodes Rx are set. One or more of the drive electrodes Tx included in one of the groups of the drive electrodes Tx are opposed to the detection electrodes Rx included in one of the groups of the detection electrodes Rx. FIG. 31 illustrates an example in which the detection electrodes Rx and the drive electrodes Tx provided in the region of a first group GC are independent from the detection electrodes Rx and the drive electrodes Tx provided in the region of a second group GD. Each of the first group GC and the second group GD serves as one group. The detection electrodes Rx located in the region of the first group GC are coupled to the first wiring group LA. The detection electrodes Rx located in the region of the second group GD are coupled to the second wiring group LB. The detection electrodes Rx of each of the groups are arranged in the second direction (Y-direction). The detection electrodes Rx of the different groups are arranged, for example, in the first direction (X-direction).

The touch detection device of the eighth embodiment includes a plurality of drive circuits. The number of the drive circuits is equal to the number of the groups. Specifically, as illustrated, for example, in FIG. 31, the touch detection device of the eighth embodiment includes a drive circuit 56A and a drive circuit 56B. The drive circuit 56A outputs the drive signal Exvcom to the drive electrodes Tx provided in the region of the first group GC. The drive circuit 56B outputs the drive signal Exvcom to the drive electrodes Tx provided in the region of the second group GD. Each of the drive circuits 56A and 56B has the same function as that of the drive circuit 56 of the first embodiment except in that only the drive electrodes Tx in a corresponding one of the groups are scanned by the output of the drive signal Exvcom. The drive circuits 56A and 56B are coupled to a drive control circuit 57. The drive control circuit 57 controls operations of the drive circuits 56A and 56B. Specifically, the drive control circuit 57 is coupled to, for example, the arithmetic unit 53. The arithmetic unit 53 of the eighth embodiment determines, based on the first touch detection, the detection electrodes Rx to be selected by the selection circuit 52 as detection electrodes to be subjected to the second touch detection. According to this determination, the arithmetic unit 53 specifies a drive circuit (the drive circuit 56A or the drive circuit 56B) coupled to any of the drive electrodes Tx opposed to the detection electrodes Rx to be subjected to the second touch detection. The drive control circuit 57 outputs the drive signal Exvcom to the specified drive circuit.

Figure 32:
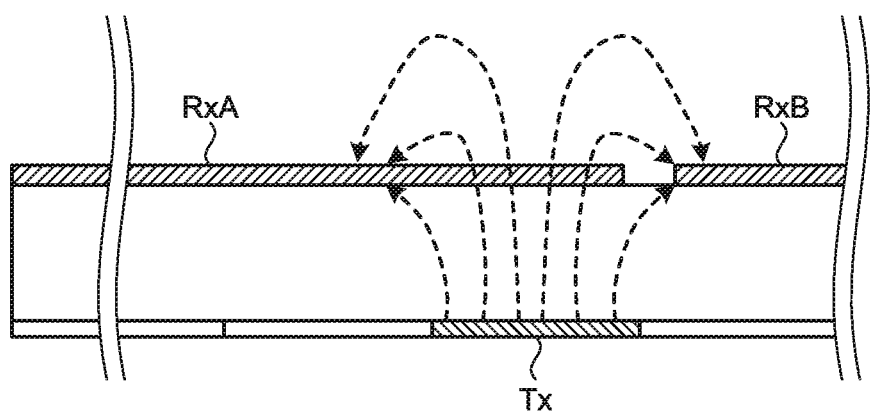
FIG. 32 is a schematic diagram illustrating an exemplary pattern in which electrostatic capacitance is generated between one of the drive electrodes included in one group and detection electrodes included in respective two groups when the drive signal is output to the drive electrode.

FIG. 32 is a schematic diagram illustrating an exemplary pattern in which the electrostatic capacitance is generated between one of the drive electrodes Tx included in one group and detection electrodes RxA and RxB included in respective two groups when the drive signal Exvcom is output to the drive electrode Tx. When the drive signal Exvcom is output to the drive electrode Tx, the mutual capacitance is generated between the drive electrode Tx and the detection electrode RxA included in the group of the drive electrode Tx. As illustrated, for example, in FIG. 32, when the drive signal Exvcom is output to the drive electrode Tx included in one group, the electrostatic capacitance is generated between the drive electrode Tx and the detection electrode RxB included in the other group as well as between the drive electrode Tx and the detection electrode RxA included in the one group, in some cases. Specifically, the output of the drive signal Exvcom to the drive electrode Tx closer to a position where the plurality of groups lie adjacent to each other is more likely to generate such a pattern as illustrated in FIG. 32. In the eighth embodiment, the detection electrode RxB is, however, included in a different group from that of the detection electrode RxA and is coupled to the detection circuit 51 at different times from times of coupling the detection electrode RxA with the detection circuit 51, so that no problem of such a pattern as illustrated in FIG. 32 occurs.

FIG. 33 is a schematic diagram illustrating a case where the second touch detection of the second group GD is performed. For example, in the example illustrated in FIG. 33, the touch operation is performed in the region of the second group GD. As a result, the touch operation is detected by the first touch detection of the second group GD. In this case, the second touch detection of the second group GD is performed. In contrast, no touch operation is performed in the region of the first group GC in the example illustrated in FIG. 33. As a result, no touch operation is detected by the first touch detection of the first group GC. In this case, the second touch detection of the first group GC is not performed.

Figure 34:
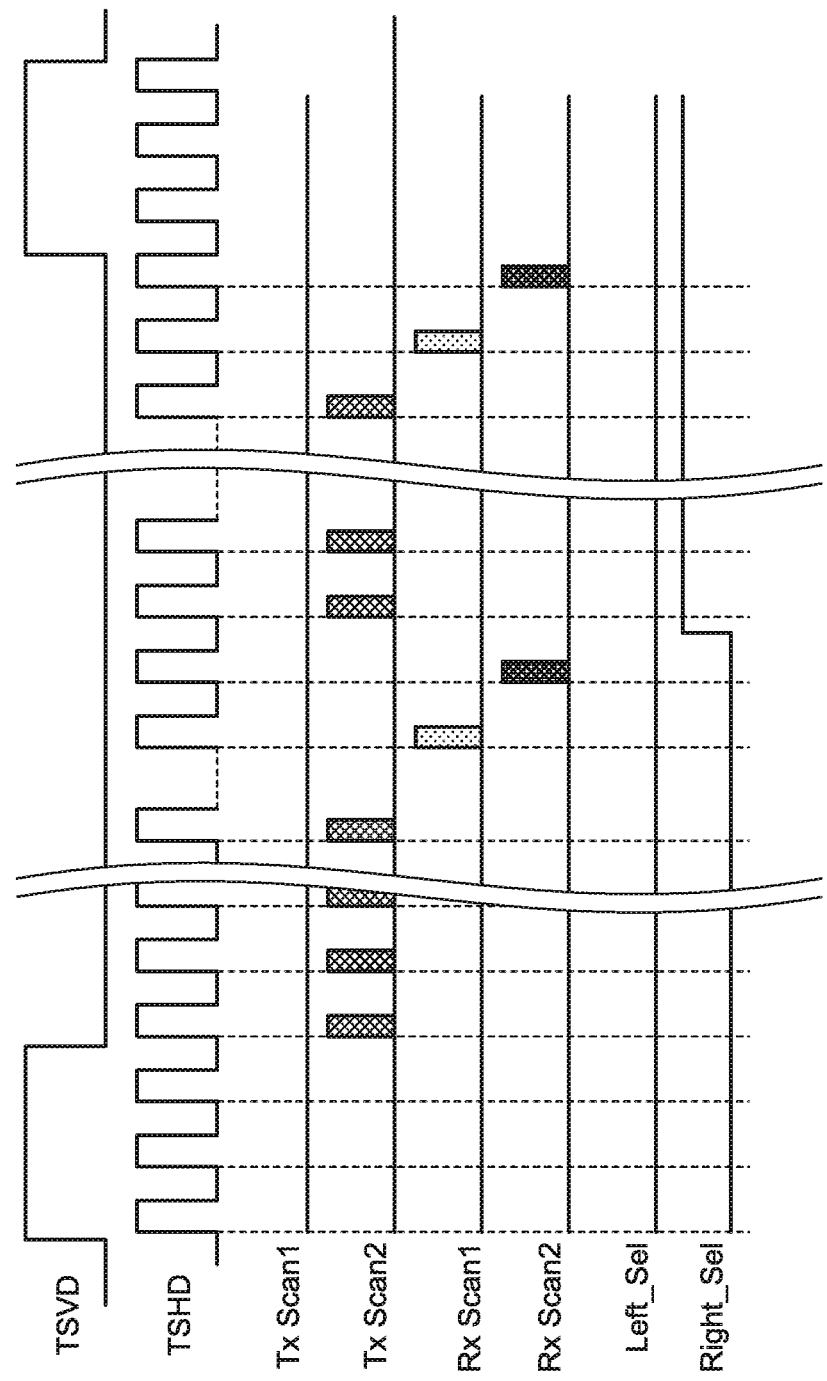
FIG. 34 is a timing diagram of the case where the second touch detection of the second group is performed.

FIG. 34 is a timing diagram of the case where the second touch detection of the second group GD is performed. In FIG. 34 and in FIG. 36 explained later, "Rx Scan1" denotes the timing of performing the first touch detection of the first group GC; "Rx Scan2" denotes the timing of performing the first touch detection of the second group GD; "Tx Scan1" denotes the timing of performing the second touch detection of the first group GC; "Tx Scan2" denotes the timing of performing the second touch detection of the second group GD; whether to perform the second touch detection of the first group GC is controlled by high/low switching of "Left_Sel"; and whether to perform the second touch detection of the second group GD is controlled by high/low switching of "Right_Sel".

In the case of the example illustrated in FIG. 33, the drive circuit 56B sequentially outputs the drive signal Exvcom according to the output timing of the pulses of the second synchronizing signal TSHD other than the timing of performing the first touch detection. In FIG. 34, the timing of the sequential output of the drive signal Exvcom by the drive circuit 56B appears as "Tx Scan2". Thus, the region of the second group GD is scanned in the arrangement direction of the drive electrodes Tx (such as the X-direction). In the example illustrated in FIGS. 33 and 34, the detection electrodes Rx included in the second group GD remain to be coupled to the detection circuit 51 by the selection circuit 52 during the period in which the detection surface is scanned as described above. As a result, the second touch detection of the second group GD is performed.

Figure 35:
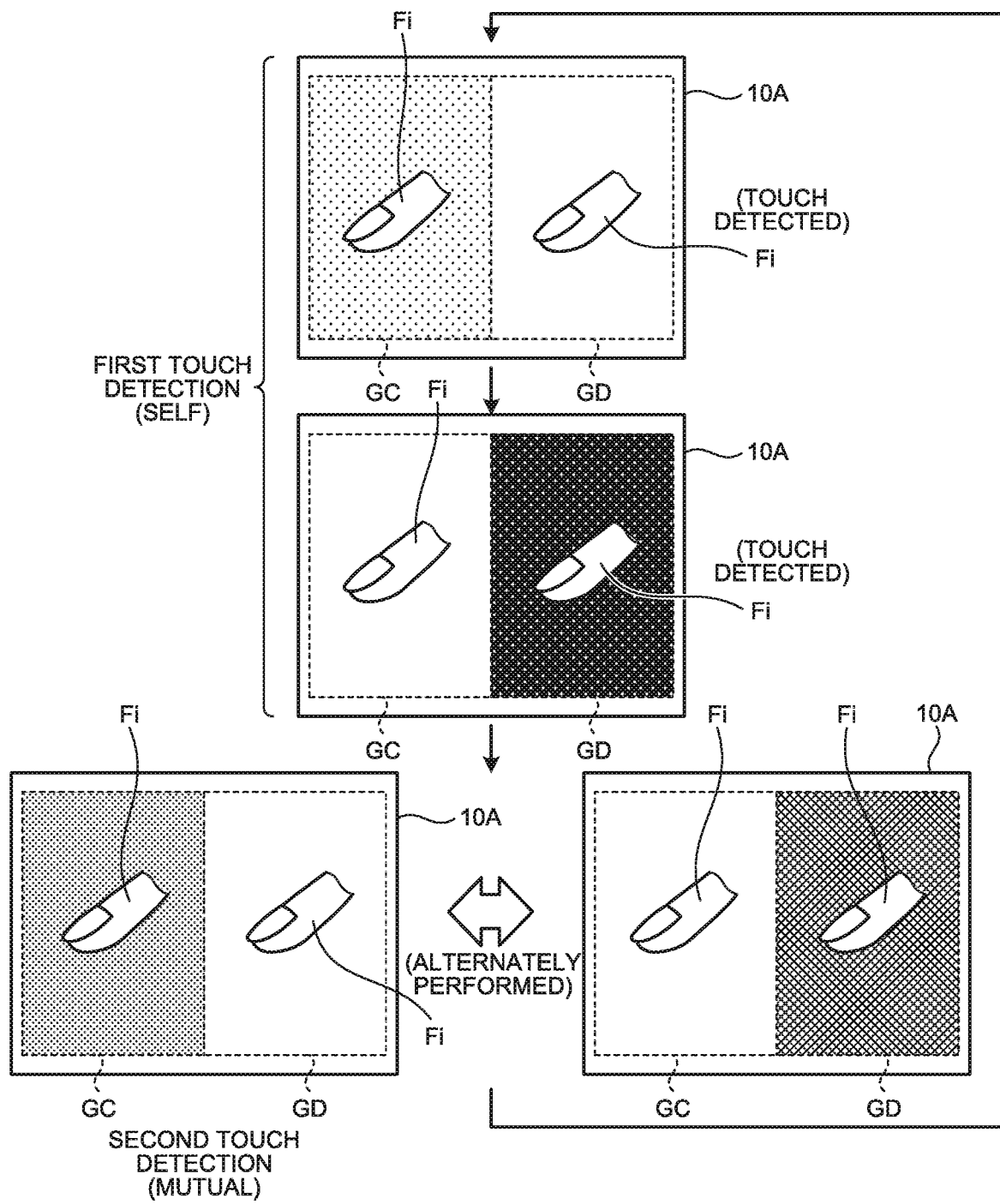
FIG. 35 is a schematic diagram illustrating a case where the second touch detection of a first group and the second touch detection of the second group are performed.
Figure 36:
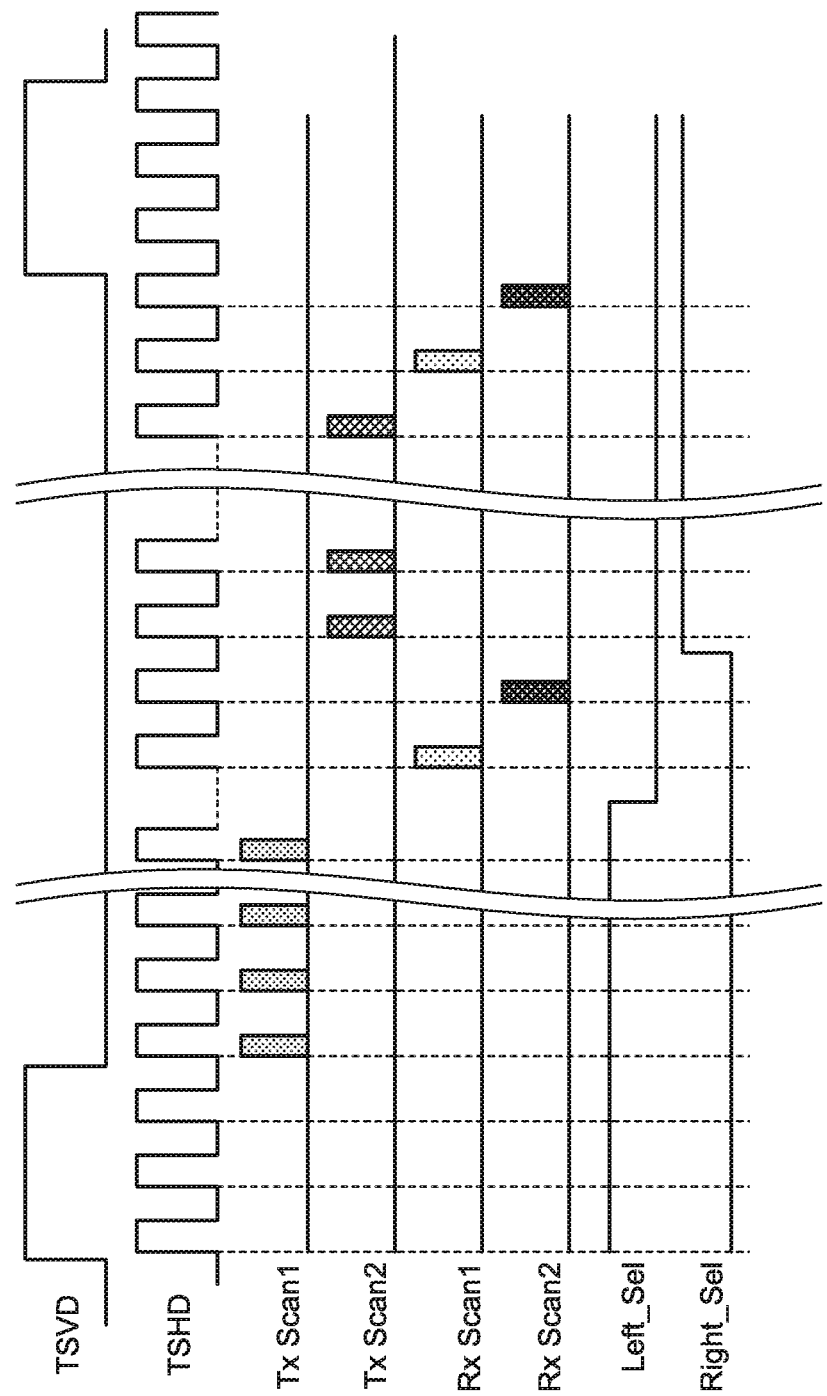
FIG. 36 is a timing diagram of the case where the second touch detection of the first group and the second touch detection of the second group are performed.

FIG. 35 is a schematic diagram illustrating a case where the second touch detection of the first group GC and the second touch detection of the second group GD are performed. FIG. 36 is a timing diagram of the case where the second touch detection of the first group GC and the second touch detection of the second group GD are performed. In the example illustrated in FIG. 35, the touch operation is performed in the region of the first group GC and the region of the second group GD. As a result, the touch operation is detected by both the first touch detection of the first group GC and the first touch detection of the second group GD. In this case, the second touch detection of the first group GC and the second touch detection of the second group GD are alternately performed. Specifically, the group of the detection electrodes Rx coupled to the detection circuit 51 is alternately switched between the first group GC and the second group GD across the timing of performing the first touch detection.

In the case of the example illustrated in FIG. 36, the drive circuits 56A and 56B sequentially output the drive signal Exvcom according to the output timing of the pulses of the second synchronizing signal TSHD. In FIG. 36, the timing of the sequential output of the drive signal Exvcom by the drive circuit 56A appears as "Tx Scan1", and the timing of the sequential output of the drive signal Exvcom by the drive circuit 56B appears as "Tx Scan2". The periods of the first touch detection ("Rx Scan1" and "Rx Scan2") are provided between the period of the sequential output of the drive signal Exvcom by the drive circuit 56A and the period of the sequential output of the drive signal Exvcom by the drive circuit 56B. As a result, the region of the first group GC and the region of the second group GD are alternately scanned in the arrangement direction of the drive electrodes Tx (such as the X-direction). The eighth embodiment is the same as the first embodiment except in the features described above.

The eighth embodiment can limit the drive electrodes Tx to be supplied with the drive signal Exvcom during the second touch detection to the drive electrodes Tx corresponding to the group of the detection electrodes Rx that has detected the touch operation during the first touch detection. As a result, the power consumption during the second touch detection can be more reduced than in the case of scanning all the drive electrodes Tx.

Modification

Figure 37:
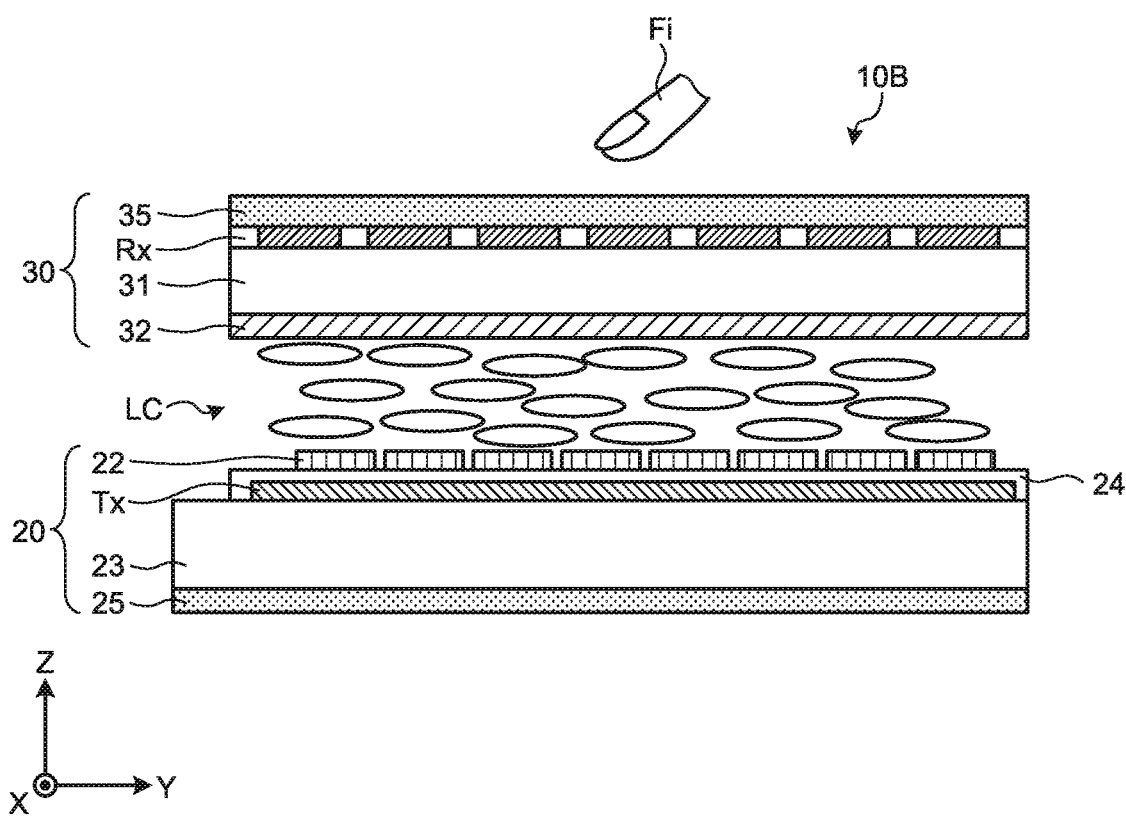
FIG. 37 is a schematic diagram illustrating a sectional structure of a display panel with a touch detection function.

The following describes a display panel with a touch detection function 10B as a modification of the touch detection panel 10 (or the touch detection panel 10A) with reference to FIG. 37. In the description of the modification, the same components as those in any one of first to eighth embodiments are assigned with the same reference numerals, and description thereof will not be given.

FIG. 37 is a schematic diagram illustrating a sectional structure of the display panel with a touch detection function 10B. The display panel with a touch detection function 10B includes a first substrate 20 and a second substrate 30. The first substrate 20 is provided with pixel electrodes 22, and the second substrate 30 is opposed to the first substrate 20 across a liquid crystal layer LC. One surface side (upper side in FIG. 37) of the second substrate 30 opposite to a side facing the liquid crystal layer LC serves as the display surface side and the detection surface side. The first substrate 20 has a configuration in which the drive electrodes Tx, an insulating layer 24, and the pixel electrodes 22 are layered on the display surface side of a glass substrate 23 as a circuit board. The insulating layer 24 insulates the pixel electrodes 22 from the drive electrodes Tx. The second substrate 30 has a configuration in which the detection electrodes Rx are provided on a display surface side of a glass substrate 31 as a circuit board, and a color filter 32 is provided on a liquid crystal layer LC side of the glass substrate 31. In the modification, a polarizing plate 25 is provided on the back surface side of the first substrate 20, and a polarizing plate 35 is provided on the display surface side of the second substrate 30. The liquid crystal layer LC is enclosed in a gap maintained with a spacer (not illustrated) provided in a space between the first substrate 20 and the second substrate 30. The glass substrates 23 and 31 are not limited to being made of glass, but may be made using another material, such as a transparent resin, that has light transmissibility and allows circuit formation.

According to the modification, the present invention can also be applied to the configuration integrated with the display panel.

Although the above description illustrates the case where the number of groups of the detection electrodes Rx is two, the number of groups of the detection electrodes Rx may be equal to or greater than three. If the number of groups of the detection electrodes Rx is a value (m) equal to or greater than three, the detection electrodes Rx grouped into one of the first groups in the seventh embodiment are one of every m detection electrodes Rx selected along the order of arrangement from among m or more of the detection electrodes Rx consecutively arranged along the second direction (Y-direction). The number of groups of the detection electrodes Rx may be equal to or greater than three not only in the seventh embodiment, but also in the other embodiments and the modification.

Other operational advantages accruing from the aspects described in the above embodiments that are appropriately conceivable by those skilled in the art from the description in this specification will naturally be understood as accruing from the present invention.

The present disclosure includes the following aspects.

1. A touch detection device comprising:
a plurality of drive electrodes;
a plurality of detection electrodes provided apart from the plurality of drive electrodes;
a detection circuit configured to be electrically coupled to a first predetermined number or less of the detection electrodes out of the plurality of detection electrodes; and
a selection circuit configured to be electrically coupled to the plurality of detection electrodes and the detection circuit,
wherein a second predetermined number as the number of the plurality of detection electrodes is larger than the first predetermined number,
wherein the selection circuit is configured to select at least one of groups each including the first predetermined number or less of the detection electrodes from the second predetermined number of the detection electrodes,
wherein the detection circuit is configured to perform first touch detection based on self-capacitance of the selected detection electrodes, and
wherein the detection circuit is configured to perform second touch detection based on mutual capacitance between the detection electrodes that perform the first touch detection and the drive electrodes.

2. The touch detection device according to 1,
wherein each of the plurality of detection electrodes extends in a first direction,
wherein each of the plurality of drive electrodes extends in a second direction different from the first direction, and
wherein the plurality of drive electrodes are configured to be coupled to a drive circuit configured to output a drive signal for generating the mutual capacitance between the detection electrode and the drive electrode.

3. The touch detection device according to 1,
wherein the selection circuit is configured to select two or more of the groups, and
wherein the detection electrodes selected to be included in one of the two or more groups by the selection circuit differ from the detection electrodes included in any other of the two or more groups.

4. The touch detection device according to 1,
wherein the selection circuit is configured to select two or more of the groups, and
wherein one or more detection electrodes among the detection electrodes selected to be included in one of the two or more groups by the selection circuit are included in another one of the two or more groups.

5. The touch detection device according to 4,
wherein the detection electrodes in different groups are configured to be selected by the selection circuit at different times, and
wherein, when a change in the self-capacitance is detected by one or more of the detection electrodes included in two of the groups, one of the two groups detects a change in the mutual capacitance.

6. The touch detection device according to 3,
wherein the detection electrodes in different groups are opposed to different ones of the drive electrodes.

7. The touch detection device according to 2,
wherein the groups are selected in two patterns by the selection circuit,
wherein one of the two patterns is that of first groups for detecting the self-capacitance of the detection electrodes,
wherein the other of the two patterns is that of second groups for detecting the mutual capacitance of the detection electrodes,
wherein the second predetermined number of the detection electrodes are arranged along the second direction, and
wherein the detection electrodes included in the first groups are one of every m detection electrodes selected along an arrangement order from among m or more of the detection electrodes consecutively arranged along the second direction,
where m denotes the number of the first groups.

8. The touch detection device according to 1,
wherein the selection circuit is configured to select two or more of the groups,
wherein the first touch detection is sequentially performed for each of the groups, and
wherein, when the self-capacitance in response to a touch operation is detected by one or more of the detection electrodes during the first touch detection, the second touch detection is performed at a time when the first touch detection is not performed.

9. The touch detection device according to 1,
wherein the first touch detection is sequentially performed for each of the groups, and
wherein, when two groups among the groups each include the detection electrodes where a change in the self-capacitance is detected, the selection circuit selects and couples all the detection electrodes included in the two groups, first selected electrodes, and second selected electrodes at the time of the second touch detection, the first selected electrodes being some of the detection electrodes included in only one of the two groups, and the second selected electrodes being some of the detection electrodes included in only the other of the two groups.

10. The touch detection device according to 9,
wherein the second predetermined number of the detection electrodes are arranged along a first direction, and
wherein the first selected electrodes and the second selected electrodes are detection electrodes alternately selected along an arrangement order from among two or more of the detection electrodes consecutively arranged along the first direction.

11. The touch detection device according to 10,
wherein the second touch detection is performed at a plurality of times,
wherein periods of selection of the first selected electrodes and the second selected electrodes are shifted from each other such that different ones of the detection electrodes are used for the second touch detections performed at the two closest times to each other among the plurality of times.

12. The touch detection device according to 3,
wherein the detection circuit is configured to perform the first touch detection based on the self-capacitance of the detection electrodes and the second touch detection based on the mutual capacitance of the detection electrodes including the detection electrodes that perform the first touch detection,
wherein the first touch detection is sequentially performed for each of the groups, and
wherein the drive electrodes used for the second touch detection are the first predetermined number or less of the detection electrodes including the detection electrodes in which a change in the self-capacitance is detected by the first touch detection performed for all the groups.

13. The touch detection device according to 6, further comprising a plurality of drive circuits,
wherein the number of the drive circuits is equal to the number of the groups,
wherein each of the drive circuits is configured to output a drive signal to the drive electrodes opposed to the detection electrodes in a corresponding one of the different groups,
wherein the detection circuit is configured to perform the first touch detection based on the self-capacitance of the detection electrodes and the second touch detection based on the mutual capacitance of the detection electrodes that perform the first touch detection, and
wherein the first touch detection is sequentially performed for each of the groups.

14. The touch detection device according to 7,
wherein the detection circuit is configured to perform the first touch detection based on the self-capacitance of the detection electrodes and the second touch detection based on the mutual capacitance thereof,
wherein the first touch detection is sequentially performed for each of the first groups, and wherein, when one or more of the detection electrodes have detected a change in the self-capacitance, the second touch detection is performed based on the mutual capacitance of the detection electrodes in the second groups including the one or more of the detection electrodes.

The present disclosure includes the following aspects.

(1) A touch detection device including
a plurality of drive electrodes,
a plurality of detection electrodes provided apart from the drive electrodes,
a detection circuit configured to be electrically coupled to a first predetermined number or less of the detection electrodes out of the plurality of detection electrodes, and
a selection circuit configured to be electrically coupled to the plurality of detection electrodes and the detection circuit,
wherein a second predetermined number as the number of the plurality of detection electrodes is larger than the first predetermined number,
wherein each of the plurality of detection electrodes extends in a first direction,
wherein each of the plurality of drive electrodes extends in a second direction different from the first direction,
wherein the plurality of drive electrodes are configured to be coupled to a drive circuit configured to output a drive signal for generating mutual capacitance between the detection electrode and the drive electrode,
wherein the selection circuit is configured to select a plurality of groups each including the first predetermined number or less of the detection electrodes from the second predetermined number of the detection electrodes,
wherein the detection electrodes selected to be included in one of the groups by the selection circuit differ from the detection electrodes included in any other of the groups,
wherein the detection circuit is configured to sequentially perform first touch detection based on self-capacitance of the selected detection electrodes for each of the groups; and
wherein, when the self-capacitance in response to a touch operation is detected by one or more of the detection electrodes during the first touch detection, the detection circuit performs, for each of the groups, second touch detection based on the mutual capacitance between the detection electrodes in the group including the one or more of the detection electrodes that have detected the self-capacitance and the drive electrodes, at a time when the first touch detection is not performed.

(2) A touch detection device including
a plurality of drive electrodes,
a plurality of detection electrodes provided apart from the drive electrodes,
a detection circuit configured to be electrically coupled to a first predetermined number or less of the detection electrodes out of the plurality of detection electrodes, and
a selection circuit configured to be electrically coupled to the plurality of detection electrodes and the detection circuit,
wherein a second predetermined number as the number of the plurality of detection electrodes is larger than the first predetermined number,
wherein each of the plurality of detection electrodes extends in a first direction,
wherein the plurality of drive electrodes extend in a second direction different from the first direction,
wherein each of the plurality of drive electrodes is configured to be coupled to a drive circuit configured to output a drive signal for generating mutual capacitance between the detection electrodes and the drive electrodes, wherein the selection circuit selects a plurality of groups each including the first predetermined number or less of the detection electrodes from the second predetermined number of the detection electrodes, wherein one or more detection electrodes among the detection electrodes selected to be included in one of the groups by the selection circuit are included in another one of the groups, wherein the detection electrodes in different groups are selected by the selection circuit at different times, wherein the detection circuit sequentially performs first touch detection based on self-capacitance of the selected detection electrodes for each of the groups, wherein, when the self-capacitance in response to a touch operation is detected by one or more of the detection electrodes during the first touch detection, the detection circuit performs, for each of the groups, second touch detection based on the mutual capacitance between the detection electrodes in the group including the one or more of the detection electrodes that have detected the self-capacitance and the drive electrodes, at a time when the first touch detection is not performed, and wherein, when a change in the self-capacitance is detected by one or more of the detection electrodes included in two of the groups, the detection circuit performs the second touch detection using one of the two groups.

(3) A touch detection device including
a plurality of drive electrodes,
a plurality of detection electrodes provided apart from the drive electrodes,
a detection circuit configured to be electrically coupled to a first predetermined number or less of the detection electrodes out of the plurality of detection electrodes, and
a selection circuit configured to be electrically coupled to the plurality of detection electrodes and the detection circuit, wherein a second predetermined number as the number of the plurality of detection electrodes is larger than the first predetermined number, wherein each of the plurality of detection electrodes extends in a first direction, wherein the plurality of drive electrodes extend in a second direction different from the first direction, wherein each of the plurality of drive electrodes is configured to be coupled to a drive circuit configured to output a drive signal for generating mutual capacitance between the detection electrodes and the drive electrodes, wherein the selection circuit selects a plurality of groups each including the first predetermined number or less of the detection electrodes from the second predetermined number of the detection electrodes, wherein the detection electrodes selected to be included in one of the groups by the selection circuit differ from the detection electrodes included in any other of the groups, wherein the detection circuit sequentially performs first touch detection based on self-capacitance of the selected detection electrodes for each of the groups, and wherein, when the self-capacitance in response to a touch operation is detected by one or more of the detection electrodes during the first touch detection, the detection circuit performs second touch detection based on the mutual capacitance between the detection electrodes in the group including the one or more of the detection electrodes that have detected the self-capacitance and the drive electrodes, at a time when the first touch detection is not performed.

(4) A touch detection device including
a plurality of drive electrodes,
a plurality of detection electrodes provided apart from the drive electrodes,
a detection circuit configured to be electrically coupled to a first predetermined number or less of the detection electrodes out of the plurality of detection electrodes, and
a selection circuit configured to be electrically coupled to the plurality of detection electrodes and the detection circuit, wherein a second predetermined number as the number of the plurality of detection electrodes is larger than the first predetermined number, wherein each of the plurality of detection electrodes extends in a first direction, wherein the plurality of drive electrodes extend in a second direction different from the first direction, wherein each of the plurality of drive electrodes is configured to be coupled to a drive circuit configured to output a drive signal for generating mutual capacitance between the detection electrodes and the drive electrodes, wherein the selection circuit selects a plurality of groups each including the first predetermined number or less of the detection electrodes from the second predetermined number of the detection electrodes, wherein one or more detection electrodes among the detection electrodes selected to be included in one of the groups by the selection circuit are included in another one of the groups, wherein the detection electrodes in different groups are configured to be selected by the selection circuit at different times, wherein the detection circuit sequentially performs first touch detection based on self-capacitance of the selected detection electrodes for each of the groups, wherein, when the self-capacitance in response to a touch operation is detected by one or more of the detection electrodes during the first touch detection, the detection circuit performs, for each of the groups, second touch detection based on the mutual capacitance between the detection electrodes in the group including the one or more of the detection electrodes that have detected the self-capacitance and the drive electrodes, at a time when the first touch detection is not performed, wherein, when a change in the self-capacitance is detected by one or more of the detection electrodes included in two of the groups, the detection circuit performs the second touch detection using one of the two groups, and wherein, when two groups among the groups each include the detection electrodes where a change in the self-capacitance is detected, the selection circuit selects and couples all the detection electrodes included in the two groups, first selected electrodes, and second selected electrodes at the time of the second touch detection, the first selected electrodes being some of the detection electrodes included in only one of the two groups, and the second selected electrodes being some of the detection electrodes included in only the other of the two groups.

(5) A touch detection device including
a plurality of drive electrodes,
a plurality of detection electrodes provided apart from the drive electrodes,
a detection circuit configured to be electrically coupled to a first predetermined number or less of the detection electrodes out of the plurality of detection electrodes, and
a selection circuit configured to be electrically coupled to the plurality of detection electrodes and the detection circuit, wherein a second predetermined number as the number of the plurality of detection electrodes is larger than the first predetermined number, wherein each of the plurality of detection electrodes extends in a first direction, wherein the plurality of drive electrodes extend in a second direction different from the first direction, wherein each of the plurality of drive electrodes is configured to be coupled to a drive circuit configured to output a drive signal for generating mutual capacitance between the detection electrodes and the drive electrodes, wherein the selection circuit selects a plurality of groups each including the first predetermined number or less of the detection electrodes from the second predetermined number of the detection electrodes, wherein one or more detection electrodes among the detection electrodes selected to be included in one of the groups by the selection circuit are included in another one of the groups, wherein the detection electrodes in different groups are configured to be selected by the selection circuit at different times, wherein the detection circuit sequentially performs first touch detection based on self-capacitance of the selected detection electrodes for each of the groups, wherein, when the self-capacitance in response to a touch operation is detected by one or more of the detection electrodes during the first touch detection, the detection circuit performs, for each of the groups, second touch detection based on the mutual capacitance between the detection electrodes in the group including the one or more of the detection electrodes that have detected the self-capacitance and the drive electrodes, at a time when the first touch detection is not performed, wherein when a change in the self-capacitance is detected by one or more of the detection electrodes included in two of the groups, the detection circuit performs the second touch detection using one of the two groups, wherein, when two groups among the groups each include the detection electrodes where a change in the self-capacitance is detected, the selection circuit selects and couples all the detection electrodes included in the two groups, first selected electrodes, and second selected electrodes at the time of the second touch detection, the first selected electrodes being some of the detection electrodes included in only one of the two groups, and the second selected electrodes being some of the detection electrodes included in only the other of the two groups, wherein the first selected electrodes and the second selected electrodes are detection electrodes alternately selected along an arrangement order from among two or more of the detection electrodes consecutively arranged along the first direction, wherein the second touch detection is performed at a plurality of times, and wherein periods of selection of the first selected electrodes and the second selected electrodes are shifted from each other such that different ones of the detection electrodes are used for the second touch detections performed at the two closest times to each other among the plurality of times.

(6) A touch detection device including
a plurality of drive electrodes,
a plurality of detection electrodes provided apart from the drive electrodes,
a detection circuit configured to be electrically coupled to a first predetermined number or less of the detection electrodes out of the plurality of detection electrodes, and
a selection circuit configured to be electrically coupled to the plurality of detection electrodes and the detection circuit, wherein a second predetermined number as the number of the plurality of detection electrodes is larger than the first predetermined number, wherein each of the plurality of detection electrodes extends in a first direction, wherein each of the plurality of drive electrodes extends in a second direction different from the first direction, wherein the drive electrodes are configured to be coupled to a drive circuit configured to output a drive signal for generating mutual capacitance between the detection electrodes and the drive electrodes, wherein, during second touch detection based on the mutual capacitance between the detection electrodes and the drive electrodes, the selection circuit selects a plurality of groups each including the first predetermined number or less of the detection electrodes from the second predetermined number of the detection electrodes, wherein one or more detection electrodes among the detection electrodes selected to be included in one of the groups by the selection circuit are included in another one of the groups, wherein the detection electrodes in different groups are configured to be selected by the selection circuit at different times, wherein the detection circuit performs first touch detection based on self-capacitance of one or more of the detection electrodes, wherein, when the self-capacitance in response to a touch operation is detected by one or more of the detection electrodes during the first touch detection, the detection circuit performs, for each of the groups, second touch detection based on the mutual capacitance between the detection electrodes in the group including the one or more of the detection electrodes that have detected the self-capacitance and the drive electrodes, at a time when the first touch detection is not performed, and wherein, when a change in the self-capacitance is detected by one or more of the detection electrodes included in two of the groups, the detection circuit performs the second touch detection using one of the two groups.

(7) A touch detection device including
a plurality of drive electrodes,
a plurality of detection electrodes provided apart from the drive electrodes,
a detection circuit configured to be electrically coupled to a first predetermined number or less of the detection electrodes out of the plurality of detection electrodes, and
a selection circuit configured to be electrically coupled to the plurality of detection electrodes and the detection circuit, wherein a second predetermined number as the number of the plurality of detection electrodes is larger than the first predetermined number, wherein each of the plurality of detection electrodes extends in a first direction, wherein each of the plurality of drive electrodes extends in a second direction different from the first direction, wherein the plurality of drive electrodes are configured to be coupled to a drive circuit configured to output a drive signal for generating mutual capacitance between the detection electrodes and the drive electrodes, wherein the selection circuit selects a plurality of groups each including the first predetermined number or less of the detection electrodes from the second predetermined number of the detection electrodes, wherein the detection circuit sequentially performs first touch detection based on self-capacitance of the selected detection electrodes for each of the groups, wherein, when the self-capacitance in response to a touch operation is detected by one or more of the detection electrodes during the first touch detection, the detection circuit performs, for each of the groups, second touch detection based on the mutual capacitance between the detection electrodes in the group including the one or more of the detection electrodes that have detected the self-capacitance and the drive electrodes, at a time when the first touch detection is not performed, wherein the groups are selected in two patterns by the selection circuit, wherein one of the two patterns is that of first groups for detecting the self-capacitance of the detection electrodes, wherein the other of the two patterns is that of second groups for detecting the mutual capacitance of the detection electrodes, wherein the second predetermined number of the detection electrodes are arranged along the second direction, wherein the detection electrodes included in the first groups are one of every m detection electrodes selected along an arrangement order from among m or more of the detection electrodes consecutively arranged along the second direction, where m denotes the number of the first groups, and wherein, when one or more of the detection electrodes have detected a change in the self-capacitance, the second touch detection is performed based on the mutual capacitance of the detection electrodes in the second groups including the one or more of the detection electrodes.

(8) A touch detection device including
a plurality of drive electrodes,
a plurality of detection electrodes provided apart from the drive electrodes,
a detection circuit configured to be electrically coupled to a first predetermined number or less of the detection electrodes out of the plurality of detection electrodes,
a selection circuit configured to be electrically coupled to the plurality of detection electrodes and the detection circuit, and
a plurality of drive circuits,
wherein a second predetermined number as the number of the plurality of detection electrodes is larger than the first predetermined number,
wherein each of the plurality of detection electrodes extends in a first direction,
wherein the plurality of drive electrodes extend in a second direction different from the first direction,
wherein each of the plurality of drive electrodes is configured to be coupled to a corresponding one of the drive circuits configured to output a drive signal for generating mutual capacitance between the detection electrodes and the drive electrodes,
wherein the detection electrodes in different groups are opposed to different ones of the drive electrodes,
wherein the selection circuit selects a plurality of groups each including the first predetermined number or less of the detection electrodes from the second predetermined number of the detection electrodes,
wherein the detection electrodes selected to be included in one of the groups by the selection circuit differ from the detection electrodes included in any other of the groups,
wherein the detection circuit is configured to sequentially performs first touch detection based on self-capacitance of the selected detection electrodes for each of the groups,
wherein, when the self-capacitance in response to a touch operation is detected by one or more of the detection electrodes during the first touch detection, the detection circuit performs, for each of the groups, second touch detection based on the mutual capacitance between the detection electrodes in the group including the one or more of the detection electrodes that have detected the self-capacitance and the drive electrodes, at a time when the first touch detection is not performed, wherein the number of the drive circuits is equal to the number of the groups, and wherein each of the drive circuits is configured to output the drive signal to the drive electrodes opposed to the detection electrodes in a corresponding one of the different groups.

What is claimed is:

1. A touch detection device comprising:
a plurality of drive electrodes;
a plurality of detection electrodes provided apart from the plurality of drive electrodes;
a detection circuit configured to be electrically coupled to a first predetermined number or less of the detection electrodes out of the plurality of detection electrodes; and
a selection circuit configured to be electrically coupled to the plurality of detection electrodes and the detection circuit,
wherein a second predetermined number as the number of the plurality of detection electrodes is larger than the first predetermined number,
wherein the selection circuit is configured to select at least one of groups each including the first predetermined number or less of the detection electrodes from the second predetermined number of the detection electrodes,
wherein the detection circuit is configured to perform first touch detection based on self-capacitance of the selected detection electrodes, and
wherein the detection circuit is configured to perform second touch detection based on mutual capacitance between the detection electrodes that perform the first touch detection and the drive electrodes;
wherein the first touch detection is sequentially performed for each of the groups, and
wherein, when two groups among the groups each include the detection electrodes where a change in the self-capacitance is detected, the selection circuit selects and couples all the detection electrodes included in the two groups, first selected electrodes, and second selected electrodes at the time of the second touch detection, the first selected electrodes being some of the detection electrodes included in only one of the two groups, and the second selected electrodes being some of the detection electrodes included in only the other of the two groups;
wherein the second predetermined number of the detection electrodes are arranged along a first direction, and
wherein the first selected electrodes and the second selected electrodes are detection electrodes alternately selected along an arrangement order from among two or more of the detection electrodes consecutively arranged along the first direction; and
wherein the second touch detection is performed at a plurality of times,
wherein periods of selection of the first selected electrodes and the second selected electrodes are shifted from each other such that different ones of the detection electrodes are used for the second touch detections performed at the two closest times to each other among the plurality of times.

2. The touch detection device according to claim 1,
wherein each of the plurality of detection electrodes extends in a first direction,
wherein each of the plurality of drive electrodes extends in a second direction different from the first direction, and
wherein the plurality of drive electrodes are configured to be coupled to a drive circuit configured to output a drive signal for generating the mutual capacitance between the detection electrode and the drive electrode.

3. The touch detection device according to claim 1,
wherein the selection circuit is configured to select two or more of the groups, and
wherein the detection electrodes selected to be included in one of the two or more groups by the selection circuit differ from the detection electrodes included in any other of the two or more groups.

4. The touch detection device according to claim 1,
wherein the selection circuit is configured to select two or more of the groups, and
wherein one or more detection electrodes among the detection electrodes selected to be included in one of the two or more groups by the selection circuit are included in another one of the two or more groups.

5. The touch detection device according to claim 4,
wherein the detection electrodes in different groups are configured to be selected by the selection circuit at different times, and
wherein, when a change in the self-capacitance is detected by one or more of the detection electrodes included in two of the groups, one of the two groups detects a change in the mutual capacitance.

6. The touch detection device according to claim 3,
wherein the detection electrodes in different groups are opposed to different ones of the drive electrodes.

7. The touch detection device according to claim 2,
wherein the groups are selected in two patterns by the selection circuit,
wherein one of the two patterns is that of first groups for detecting the self-capacitance of the detection electrodes,
wherein the other of the two patterns is that of second groups for detecting the mutual capacitance of the detection electrodes,
wherein the second predetermined number of the detection electrodes are arranged along the second direction, and
wherein the detection electrodes included in the first groups are one of every m detection electrodes selected along an arrangement order from among m or more of the detection electrodes consecutively arranged along the second direction,
where m denotes the number of the first groups.

8. The touch detection device according to claim 1,
wherein the selection circuit is configured to select two or more of the groups,
wherein the first touch detection is sequentially performed for each of the groups, and
wherein, when the self-capacitance in response to a touch operation is detected by one or more of the detection electrodes during the first touch detection, the second touch detection is performed at a time when the first touch detection is not performed.

9. The touch detection device according to claim 3,
wherein the detection circuit is configured to perform the first touch detection based on the self-capacitance of the detection electrodes and the second touch detection based on the mutual capacitance of the detection electrodes including the detection electrodes that perform the first touch detection,
wherein the first touch detection is sequentially performed for each of the groups, and
wherein the drive electrodes used for the second touch detection are the first predetermined number or less of the detection electrodes including the detection electrodes in which a change in the self- capacitance is detected by the first touch detection performed for all the groups.

10. The touch detection device according to claim 6, further comprising a plurality of drive circuits,
wherein the number of the drive circuits is equal to the number of the groups,
wherein each of the drive circuits is configured to output a drive signal to the drive electrodes opposed to the detection electrodes in a corresponding one of the different groups,
wherein the detection circuit is configured to perform the first touch detection based on the self-capacitance of the detection electrodes and the second touch detection based on the mutual capacitance of the detection electrodes that perform the first touch detection, and
wherein the first touch detection is sequentially performed for each of the groups.

11. The touch detection device according to claim 7,
wherein the detection circuit is configured to perform the first touch detection based on the self-capacitance of the detection electrodes and the second touch detection based on the mutual capacitance thereof,
wherein the first touch detection is sequentially performed for each of the first groups, and
wherein, when one or more of the detection electrodes have detected a change in the self-capacitance, the second touch detection is performed based on the mutual capacitance of the detection electrodes in the second groups including the one or more of the detection electrodes.

* * * * *